(12) United States Patent
Greyshock

(10) Patent No.: US 7,748,628 B2
(45) Date of Patent: Jul. 6, 2010

(54) SYSTEMS AND METHODS FOR SCANNING AN IDENTIFICATION CODE OF AN UNKNOWN ORIENTATION

(75) Inventor: Shawn T. Greyshock, Tarentum, PA (US)

(73) Assignee: McKesson Automation Inc., Cranberry, PA (US)

( * ) Notice: Subject to any disclaimer, the term of this patent is extended or adjusted under 35 U.S.C. 154(b) by 429 days.

(21) Appl. No.: 11/611,956

(22) Filed: Dec. 18, 2006

(65) Prior Publication Data

US 2007/0262147 A1   Nov. 15, 2007

Related U.S. Application Data

(63) Continuation of application No. 11/382,605, filed on May 10, 2006.

(51) Int. Cl.
*G06K 7/10* (2006.01)
(52) U.S. Cl. .................... 235/462.01; 235/454
(58) Field of Classification Search ............ 235/435, 235/454, 462.01, 462.08, 487
See application file for complete search history.

(56) References Cited

U.S. PATENT DOCUMENTS

| | | | |
|---|---|---|---|
| 4,811,764 A | 3/1989 | McLaughlin |
| 4,857,716 A | 8/1989 | Gombrich et al. |
| 4,967,928 A | 11/1990 | Carter |
| 5,014,875 A | 5/1991 | McLaughlin et al. |
| 5,155,343 A | 10/1992 | Chandler et al. |
| 5,259,668 A | 11/1993 | Teufel et al. |
| 5,317,652 A | 5/1994 | Chatterjee |
| 5,396,054 A | 3/1995 | Krichever et al. |
| 5,468,110 A | 11/1995 | McDonald et al. |
| 5,502,944 A | 4/1996 | Kraft et al. |
| 5,504,319 A | 4/1996 | Li et al. |

(Continued)

FOREIGN PATENT DOCUMENTS

WO   WO2004/039355 A1   5/2004

(Continued)

OTHER PUBLICATIONS

McKesson, RobotRx™—Nothing is Faster or More Accurate at Dispensing Medications, pp. 1-2, McKesson Automation.

(Continued)

*Primary Examiner*—Thien Minh Le
*Assistant Examiner*—April A Taylor
(74) *Attorney, Agent, or Firm*—Alston & Bird LLP

(57) ABSTRACT

A system, method and corresponding apparatus are provided for storing, retrieving and delivering unit dose blisters in their natural, raw state (i.e., without over-wrapping or repackaging). In particular, a plurality of unit dose blister mounts are configured to position a corresponding plurality of different types of unit dose blisters in a predetermined, repeatable orientation, so that they can be retrieved and delivered using, for example, an automated retrieval system. The storage apparatus (or unit dose blister mount) may include a cavity that is configured to receive a unit dose medication or medication cavity of the unit dose blister in such a way that the unit dose blister lies substantially flat in the horizontal plane, enabling any identification information displayed on the underside of the unit dose blister (i.e., the side opposite the unit dose medication, or medication cavity) to be viewed.

23 Claims, 20 Drawing Sheets

U.S. PATENT DOCUMENTS

| | | | |
|---|---|---|---|
| 5,523,552 | A | 6/1996 | Shellhammer et al. |
| 5,525,788 | A | 6/1996 | Bridgelall et al. |
| 5,536,084 | A | 7/1996 | Curtis et al. |
| 5,564,593 | A | 10/1996 | East, Sr. |
| 5,591,952 | A | 1/1997 | Krichever et al. |
| 5,593,267 | A | 1/1997 | McDonald et al. |
| 5,635,697 | A | 6/1997 | Shellhammer et al. |
| 5,635,699 | A | 6/1997 | Cherry et al. |
| 5,642,442 | A | 6/1997 | Morton et al. |
| 5,673,983 | A | 10/1997 | Carlson et al. |
| 5,778,133 | A | 7/1998 | Plesko |
| 5,797,515 | A | 8/1998 | Liff et al. |
| 5,805,051 | A | 9/1998 | Herrmann et al. |
| 5,805,456 | A | 9/1998 | Higham et al. |
| 5,834,749 | A * | 11/1998 | Durbin ................. 235/454 |
| 5,880,443 | A | 3/1999 | McDonald et al. |
| 5,905,653 | A | 5/1999 | Higham et al. |
| 6,142,376 | A | 11/2000 | Cherry et al. |
| 6,151,536 | A | 11/2000 | Arnold et al. |
| 6,163,737 | A | 12/2000 | Fedor et al. |
| 6,170,929 | B1 | 1/2001 | Wilson et al. |
| 6,175,779 | B1 | 1/2001 | Barrett |
| 6,189,727 | B1 | 2/2001 | Shoenfeld |
| 6,219,587 | B1 | 4/2001 | Ahlin et al. |
| 6,354,783 | B1 | 3/2002 | Stoy et al. |
| 6,435,370 | B1 | 8/2002 | Wilson |
| 6,499,665 | B1 * | 12/2002 | Meunier et al. ........... 235/487 |
| 6,585,163 | B1 * | 7/2003 | Meunier et al. ........... 235/487 |
| 6,604,019 | B2 | 8/2003 | Ahlin et al. |
| 6,611,733 | B1 | 8/2003 | De La Huerga |
| 6,749,120 | B2 * | 6/2004 | Hung et al. ........ 235/472.01 |
| 6,948,662 | B2 | 9/2005 | Dvorkis |
| 7,007,846 | B2 | 3/2006 | Shellhammer |
| 7,228,198 | B2 | 6/2007 | Vollm et al. |
| 7,249,688 | B2 | 7/2007 | Hunter et al. |
| 7,502,666 | B2 | 3/2009 | Siegel et al. |
| 2002/0196977 | A1 | 12/2002 | Navon |
| 2003/0228057 | A1 | 12/2003 | Paquette |
| 2004/0029362 | A1 * | 2/2004 | Liu ...................... 438/460 |
| 2004/0040975 | A1 | 3/2004 | Hunter et al. |
| 2004/0249498 | A1 | 12/2004 | William et al. |
| 2005/0103848 | A1 | 5/2005 | Zhu et al. |
| 2005/0240305 | A1 | 10/2005 | Bogash et al. |
| 2006/0079996 | A1 | 4/2006 | Benouali |
| 2006/0122729 | A1 * | 6/2006 | Murphy et al. .............. 700/222 |
| 2007/0265730 | A1 * | 11/2007 | Greyshock ................. 700/236 |

FOREIGN PATENT DOCUMENTS

| | | |
|---|---|---|
| WO | WO 2004/039355 A1 | 5/2004 |
| WO | WO 2005/005266 A | 1/2005 |
| WO | WO 2005/109119 A | 11/2005 |

OTHER PUBLICATIONS

McKesson Automation, Robot-Rx®, Retrieved Jan. 5, 2006 from Internet Site http://www.mckessonautomation.com/wt/auto/tech_forpharmacy_robotrx, pp. 1-2, McKesson Automation.

McKesson, CJW Medical Center Employs Pharmacy Robot to Improve Medication Orders, Pharmacy Week Supplement, Oct. 19, 2003, p. 1 of 1, Richmond Times Dispatch.

Tommiea P. Jackson, Robot Does the Work of a Pharmacist in Record Time, Nov. 21, 2003, p. 1 of 1, USA Today.

International Search Report for PCT/2007/011352, mailed Aug. 11, 2007.

International Search Report and Written Opinion for PCT/US2007/011352 mailed Dec. 3, 2008.

Office Action from U.S. Appl. No. 11/382,605 mailed Mar. 13, 2009.

Office Action from U.S. Appl. No. 11/382,605 mailed Oct. 5, 2009.

*Trialpack 640—Robot Blister Packaging System for Clinical Trials*, http://www.fleximation.com/trialpack/tpac600.html (visited Mar. 16, 2009).

*Trialpack—Flexible Product Handling*, http://fleximation.com/trialpack/vision.html (visited Mar. 16, 2009).

*Trialpack 640—Technical Data and Features*, http://fleximation.com/trialpack/600_technical_data.html (visited Mar. 16, 2009).

BancTec Ltd, BancTec Prescribes Solutions for the Pharmaceutical Industry, Retrieved from Internet Site www.banctec.com/wp-content/uploads/PPA_uk.pdf, Date Unknown, pp. 1-2, BancTec Ltd.

International Preliminary Report on Patentability for PCT/US2007/011352 mailed Dec. 31, 2008.

Office Action from U.S. Appl. No. 11/611,956 mailed Apr. 2, 2009.

Office Action from U.S. Appl. No. 11/611,956 mailed Dec. 10, 2009.

Office Action from U.S. Appl. No. 11/382,605 mailed Mar. 31, 2010.

* cited by examiner

SYSTEMS AND METHODS FOR SCANNING AN IDENTIFICATION CODE OF AN UNKNOWN ORIENTATION

CROSS-REFERENCE TO RELATED APPLICATIONS

This application is a continuation of U.S. application Ser. No. 11/382,605 filed May 10, 2006 entitled System, Method and Corresponding Apparatus for Storing, Retrieving and Delivering Unit Dose Blisters, which is hereby incorporated herein in its entirety by reference.

FIELD OF THE INVENTION

Exemplary embodiments of the present invention relate generally to storing and retrieving unit dose medications and, in particular, to a means for storing unit dose blisters in their natural state in a predetermined, repeatable orientation.

BACKGROUND OF THE INVENTION

In a typical hospital, nursing home, or other similar institution, doctors will visit their patients on a routine basis and prescribe various medications for each patient. In turn, each patient will likely be placed on a certain medication treatment plan that requires that he or she take one or more doses of various medications daily. Some medications may require that they be administered only at certain times of the day (e.g., after meals) and/or at intervals of one or more hours each day. In addition, patients may request certain medications on an elective basis for complaints, such as head or body aches. These requests are typically included with the doctor's medication request or prescription that he or she sends to a pharmacy of the hospital for filling.

Medication requests or prescriptions received by the pharmacy will likely be checked by a registered pharmacist and then entered into the pharmacy information system. These requests reflect not only orders that are added to a particular patient's treatment plan, but also changes in a patient's existing treatment plan. The pharmacy information system combines this information with the patient's existing medication schedule and develops a patient medication profile. Using the patient medication profile, a fill list can be created that lists all medications that must be distributed to all patients for a given time period (e.g., a day).

In some instances, this list is printed and used by a pharmacist or pharmacy technician to hand pick each of the drugs needed for each patient (in the form of unit doses) and place those drugs in corresponding patient-specific medication containers (e.g., boxes, bins or bags). A registered pharmacist then checks the accuracy of the patient order, and, assuming the order was accurate, the individual patient boxes are loaded into a large transport cart and delivered to a nursing unit.

Several drawbacks exist, however, to this method of medication retrieval and distribution. In particular, it is very time consuming and manpower intensive. As a result, systems were created for automating the process of retrieving unit dose medications and distributing them to patients according to their respective medication profiles. One example of such a system is the ROBOT-Rx® system, offered by McKesson Automation Inc. and described in U.S. Pat. Nos. 5,468,110, 5,593,267 and 5,880,443, the contents of which are hereby incorporated herein by reference.

The ROBOT-Rx® system, like other similar systems, is a stationary robotic system that automates the drug storing, dispensing, returning, restocking and crediting process by using barcode technology. In particular, single doses of medications are packaged, for example in a clear plastic bag, so that each package contains a barcode corresponding to the package contents. The barcode may include the name of the medication, quantity, weight, instructions for use and/or expiration date.

The packaged medications are then stored in a storage area, such as a storage rack having a frame and a plurality of rod supports on which each package can be hung in a manner that provides each with an X, Y coordinate. Using the X, Y coordinates, packages can then be selected by an automated picking means (e.g., a robotic arm capable of moving at least in three, mutually orthogonal directions designated X, Y and Z), for distribution to individual patients.

More specifically, in one instance, a pharmacist or technician may manually enter the identification of a specific medication he or she would like the automated system to retrieve, for example, as a patient's first dose, in an emergency situation. The automated system, and, in particular, a computer associated with the automated system, would then locate the desired medication (i.e., the X, Y and Z coordinates of the medication) and instruct the picking means to retrieve the medication at that location. In another instance, the fill list created based on each patient's medication profile may be communicated to the computer associated with the automated system, providing the automated system with a current list of all patients and their individual medication needs. The computer also maintains a database of all medications stored in the storage area along with their corresponding X, Y and Z coordinates.

Patient-specific containers (e.g., drawers or bins) displaying barcodes that include the corresponding patient's unique identification code are placed on a conveyer belt associated with the automated system. At one point on the belt, a barcode reader reads the barcode displayed on the box and communicates the patient's identification to the computer. The computer will then retrieve the patient's medication needs from the fill list, and determine the corresponding coordinates for each medication by accessing the database.

The computer can then guide the picking means to select the desired unit dose medications and deposit them in the patient-specific boxes or containers. In particular, the picking means, which also includes a barcode reader, moves to the designated location of a particular medication, as instructed by the computer, scans the barcode displayed on the package containing the medication to determine the identification of the medication contained in the package, and provides the identity to the computer.

After the computer confirms that the correct unit dose medication is contained in the package, the picking means will remove the package from the storage area (e.g., using a vacuum generator to produce suction to pull the package off the rod, or other holding means, and hold the package until it can be deposited) and drop it into the patient-specific container.

The process is repeated until the patient's prescription has been filled (i.e., until the patient-specific medication container contains each dose of medication to be taken by the patient in the given time period or, in the instance where the unit dose retrieved the first dose for a new patient, until that first dose has been retrieved). The conveyer belt then moves the patient-specific container to a check station where an operator can use yet another barcode reader to scan the barcode label on the patient-specific container to retrieve and display the patient's prescription, as well as to scan the barcodes on each package in the container to verify that the medications are correct.

As described above, unit dose medications dispensed robotically are generally packaged into bags, boxes or a variety of other over-wraps prior to being stored in the storage area. This repackaging effort is performed for several reasons. First, the size and shape of the raw packages vary greatly; therefore, without some commonality in product shape, robotic handling becomes extremely difficult. Second, while robotic systems typically rely on barcodes to identify the products throughout the process, the majority of products originating from various manufacturers do not contain barcodes of any kind. It, therefore, becomes necessary in these instances to over-wrap the unit dose with a package containing a barcode for identification purposes.

While repackaging medications may solve these problems related to handling doses in an automated fashion, this process introduces many other issues for the hospital or similar institution. For example, repackaging adds material costs to the final product and requires both additional technician time to perform the packaging as well as additional pharmacist time to validate the content of the package against the description on the label. In addition, repacking by a hospital, or similar institution, shortens the expiration date of the repackaged item based on United States Pharmacopeia/National Formulary (USP/NF) repackaging standards.

In addition, at least one of the reasons for repackaging will soon no longer exist. The Federal Drug Administration (FDA) has mandated that all human drug products have a barcode on the smallest container or package distributed which, in many instances, is the unit dose medication. This includes all human prescription drug products and over-the-counter drugs that are dispensed pursuant to an order in the hospital. This rule applies to manufacturers, repackagers, relabelers and private distributors. The barcode must contain, at a minimum, a National Drug Code (NDC) in a linear barcode, in the Uniform Code Council (UCC) or Health Industry Business Communications Council (HIBCC) format. Following the effective date of this mandate, assuming that the unit dose medications are the smallest container or package used, therefore, all unit dose medications will contain barcodes that can be used by robotic dispensing systems, thus eliminating the need to overwrap or repackage merely for identification purposes.

A need, therefore, exists for a means for handling unit dose medications in their natural state in an automated dispensing system; thus eliminating the need for repackaging or over-wrapping the unit dose medication. In particular, a need exists for a means of handling the unit dose medications in a manner that takes advantage of the barcodes, or similar identification codes, contained on the medication, yet overcomes the obstacle of handling raw packages of various sizes and shapes.

BRIEF SUMMARY OF THE INVENTION

In general, exemplary embodiments of the present invention provide an improvement over the known prior art by, among other things, providing a means for storing and handling unit dose blisters, as well as single dose medications packaged in other manners, in their natural state (i.e., without requiring that the medication be over-wrapped or repackaged).

In particular, according to one aspect of the present invention, a storage apparatus is provided that is configured to accept a plurality of different types of unit dose packages. The storage apparatus of this aspect of the present invention may comprise a carrier configured to hold a plurality of different types of unit dose packages of different shapes and sizes, such that when held, respective unit dose packages lie and are maintained in a predetermined plane relative to the carrier.

In one exemplary embodiment, the plurality of unit dose packages comprise a plurality of unit dose blisters, wherein respective unit dose blisters comprise a support panel and a unit dose medication carried by the support panel. In particular, according to this exemplary embodiment, when the unit dose blister is held by the carrier, the support panel is maintained in the predetermined plane relative to the carrier. In another exemplary embodiment, the carrier defines a cavity that is configured to receive the unit dose medication of the unit dose blister.

In one exemplary embodiment, the support panel of the unit dose blister has first and second sides with the unit dose medication proximate the first side and the second side including an identification code that includes information identifying the unit dose medication. The identification code may be selected from the group consisting of a barcode, a radio frequency identification tag and text. In this exemplary embodiment, the carrier is configured to contact the first side of the support panel such that the identification code is exposed. For example, the carrier may include a surface, through which the cavity opens, such that the support panel of each unit dose blister contacts and is supported by the surface in a plane substantially parallel to the surface of the carrier. The carrier of this exemplary embodiment, may define a plurality of cavities, each configured to receive the unit dose medication of a respective unit dose blister, such that the support panel of each unit dose blister is maintained in a respective predetermined plane relative to the carrier.

In one exemplary embodiment, the apparatus further includes a retention mechanism configured to hold the unit dose package in the predetermined plane relative to the carrier. In another exemplary embodiment, the apparatus may further include a clipping mechanism configured to hold the carrier in a storage system while the storage system is in motion. In still another exemplary embodiment, the carrier may include a unique identifier capable of identifying at least one of the carrier itself or the unit dose medication carried by the support panel of the carrier.

In accordance with another aspect of the present invention, a system is provided for retrieving and delivering one or more unit dose packages. In one exemplary embodiment, the system includes a storage system, a unit dose package mount, a picking system and a controller. The picking system of this exemplary embodiment may be configured to retrieve a unit dose package from the storage system and to delivery the unit dose package to a predefined location. The controller of this exemplary embodiment may be capable of directing the picking system to retrieve and deliver the unit dose package.

The storage system of this exemplary embodiment may be capable of storing a plurality of unit dose packages. The unit dose package mount of this exemplary embodiment may be configured to position a plurality of different types of unit dose package of different shapes and sizes, such that respective unit dose packages are repeatably maintained in a predetermined plane. The unit dose package mount may hold and position a respective unit dose package while the unit dose package is stored by the storage system and/or while the unit dose package is at the predefined location to which the picking system delivered the unit dose package. In any event, the unit dose package mount advantageously maintains the unit dose package in the repeatable position while the unit dose package is inspected and verified.

In one exemplary embodiment, the plurality of unit dose packages comprise a plurality of unit dose blisters, wherein respective unit dose blisters comprise a support panel and a unit dose medication carried by the support panel, such that the support panel is repeatedly maintained in the predetermined plane by the unit dose package mount.

In one exemplary embodiment, the unit dose package mount comprises a carrier defining a cavity therein, wherein the cavity of the carrier is configured to receive the unit dose medication, while the support panel of the unit dose blister lies and is maintained in a predetermined plane relative to the carrier.

In another exemplary embodiment, the support panel of each unit dose blister has opposed first and second sides with the unit dose medication proximate the first side and the second side including an identification code. The system of this exemplary embodiment may further include an identification code reader configured to read the identification code of the unit dose blister, while the unit dose blister is positioned in the predetermined plane to determine an identity of the unit dose medication and to transmit the identity to the controller. The controller of this exemplary embodiment may, in turn, be further capable of receiving the identity and of verifying that the unit dose medication is correct based at least in part on the identity. In one exemplary embodiment, the identification code includes at least one of a barcode, radio frequency identification (RFID) tag, or text, and the code reader includes at least one of a barcode or RFID tag reader, or a camera.

In one exemplary embodiment, the storage system is capable of storing a plurality of unit dose package mounts with each containing at least one unit dose package. The picking system of this exemplary embodiment may include a mount removal mechanism configured to at least partially remove respective unit dose package mounts from the storage system. In one exemplary embodiment, the unit dose package mount includes a handle and the mount removal mechanism comprises a gripper configured to grip the handle of the unit dose package mount and an extension mechanism configured to extend the gripper from a first position to a second position, wherein the second position is proximate to the unit dose package mount such that the gripper is capable of engaging the handle of the unit dose package mount. The mount removal mechanism may further include a retraction mechanism configured to retract the gripper from the second position to the first position once the handle has been gripped. In one exemplary embodiment, the gripper is configured to grip the handle of the unit dose package mount when the gripper and handle are not aligned.

In one exemplary embodiment, the picking system includes a package removal mechanism configured to remove one or more unit dose packages from respective unit dose package mounts following identification of the unit dose package. The package removal mechanism of one exemplary embodiment includes one or more vacuum generators configured to generate sufficient suction to remove the unit dose package from the unit dose package mount.

In one exemplary embodiment, the controller stores a location associated with respective unit dose packages within the storage system. The controller in another exemplary embodiment stores one or more prescription orders, each comprising an identification number and corresponding one or more unit dose medications.

According to yet another aspect of the present invention, a method is provided of retrieving and delivering one or more unit dose packages. In one exemplary embodiment, the method includes: (1) determining a location in a storage system at which a unit dose package is stored; (2) removing the unit dose package from the storage system; (3) delivering the unit dose package to a predefined location; and (4) positioning the unit dose package delivered to the predefined location and having any one of a plurality of different shapes and sizes, such that the unit dose package is maintained in a predetermined plane.

In one exemplary embodiment, the one or more unit dose packages comprise one or more unit dose blisters, wherein respective unit dose blisters comprise a support panel and a unit dose medication carried by the support panel. In this exemplary embodiment, positioning the unit dose package such that the unit dose package is maintained in a predetermined plane comprises positioning the unit dose blister such that the support panel is so maintained.

In one exemplary embodiment, the support panel has opposed first and second sides with the unit dose medication proximate the first side and the second side including an identification code that includes information identifying the unit dose medication. The method of this exemplary embodiment may further include reading the identification code of the unit dose blister to determine an identity of the unit dose medication when the unit dose blister is delivered to the predefined location, and verifying that the unit dose medication is correct, based at least in part on the identity.

In one exemplary embodiment, the method further includes reading an identification code associated with a patient-specific medication container to determined an identity of a patient for which a prescription is to be filed, and identifying, based at least in part on the identity, one or more single dose medications necessary to fill the prescription. The method may further include delivering the unit dose blister to the patient-specific medication container following verification of the unit dose medication. The method of another exemplary embodiment may include reading an identification code associated with a floor stock container to determine one or more unit dose medications necessary for restocking.

In one exemplary embodiment, positioning the unit dose blister includes holding the unit dose blister with a carrier that defines a cavity therein that is configured to receive a plurality of different types of unit dose blisters of different shapes and sizes, wherein holding the unit dose blister comprises disposing the unit dose medication within the cavity and maintaining the support panel in a predetermined plane relative to the carrier. In one exemplary embodiment, maintaining the support panel in the predetermined plane relative to the carrier comprises maintaining the support panel as a result of contact between the support panel and the carrier.

According to yet another aspect of the present invention, a method is provided of retrieving and delivering one or more unit dose packages. In one exemplary embodiment, the method includes: (1) storing a plurality of unit dose packages of different shapes and sizes in a storage system, such that respective unit dose packages maintained in a predetermined plane; (2) determining a location in the storage system at which one of the plurality of unit dose packages is stored; (3) removing the unit dose package from the storage system; and (4) delivering the unit dose package to a predefined location.

In one exemplary embodiment, the plurality of unit dose packages comprises a plurality of unit dose blisters, wherein respective unit dose blisters comprise a support panel and a unit dose medication carried by the support panel. In this exemplary embodiment, storing a plurality of unit dose packages such that respective unit dose packages are maintained in a predetermined plane comprises storing a plurality of unit dose blisters such that respective support panels are maintained in the predetermined plane.

In one exemplary embodiment, storing the plurality of unit dose blisters includes holding respective the unit dose blisters with a carrier that defines a cavity therein that is configured to receive a plurality of different types of unit dose blisters of different shapes and sizes, wherein holding the unit dose blister comprises disposing the unit dose medication within the cavity and maintaining the support panel in a predetermined plane relative to the carrier. In one exemplary embodiment, the support panel is maintained in the predetermined plane relative to the carrier as a result of contact between the support panel and the carrier.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Overview:

In general, exemplary embodiments of the present invention provide a means for storing unit dose packages in their natural, raw state in a repeatable, predetermined orientation, so that they can be selectively retrieved and delivered, for example by one of the automatic retrieval systems discussed above (e.g., the ROBOT-Rx® system). In particular, by maintaining the unit dose packages in a repeatable orientation, the identification codes associated with respective packages are capable of being read prior to dispelling the packages from the system. Exemplary embodiments, therefore, eliminate the need to over-wrap or repackage the unit dose packages (e.g., unit dose blisters) prior to use in the automated systems.

Figure 1:
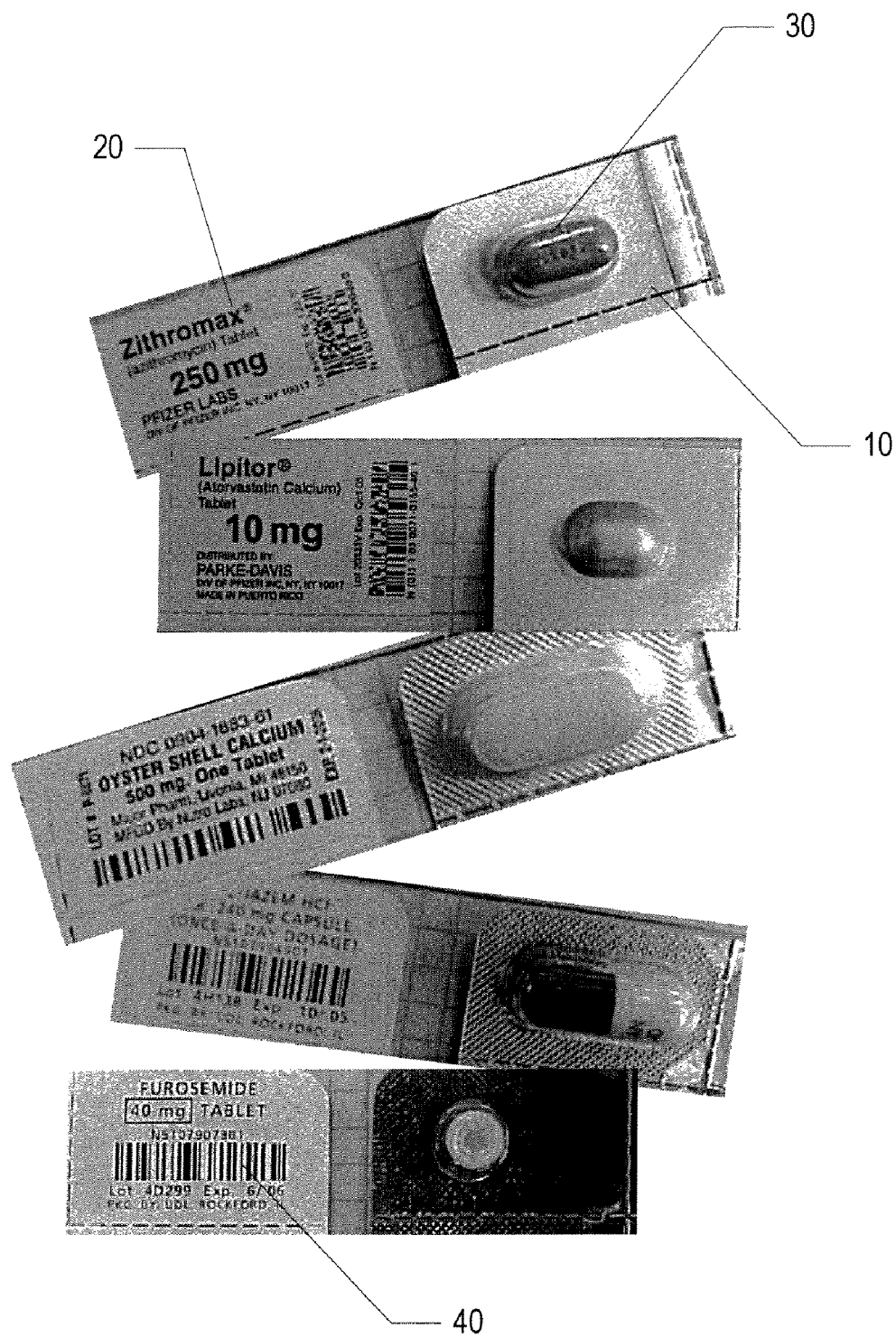
FIG. 1 illustrates several unit dose blisters.

The term "unit dose blister" refers to a unit dose medication, or one or more oral solids of the same or different strength, form or type, that has been sealed in a package, such as a vinyl and foil package in which the vinyl conforms to the shape of the medication. The vinyl is typically sealed to a foil that offers a flat surface with medication information printed on the opposite side from the vinyl cavity. FIG. 1 illustrates several examples of unit dose blisters. As shown, the unit dose blister may include a support panel having opposed first 10 and second 20 sides, wherein the unit dose medication 30 (i.e., the one or more oral solids) is positioned proximate the first side 10 of the support panel, and an identification code 40 (e.g, a barcode, radio frequency identification (RFID) tag, or simple text including any number and combination of alphanumeric characters) including information identifying the unit dose medication 30 is displayed on the second side 20 of the support panel.

When unit dose medications are packaged into a blister, they are typically packaged with several medications per blister card; thus, there are a corresponding number of equally-spaced vinyl formed cavities per blister card. These cavities are typically separated by a perforation. A singulated blister is one that has been separated from a blister card typically along its perforation.

As one of ordinary skill in the art will recognize, while reference is made throughout to unit dose blisters of the form described above, these unit dose blisters provide just one form in which unit dose medications may be packaged. Use of unit dose blisters in the description of exemplary embodiments included herein should not, therefore, be taken as limiting the scope of the present invention to use with such unit dose packages. In contrast, other unit dose packages may similarly be used in connection with exemplary embodiments without departing from the spirit and scope of the present invention.

Figure 2:
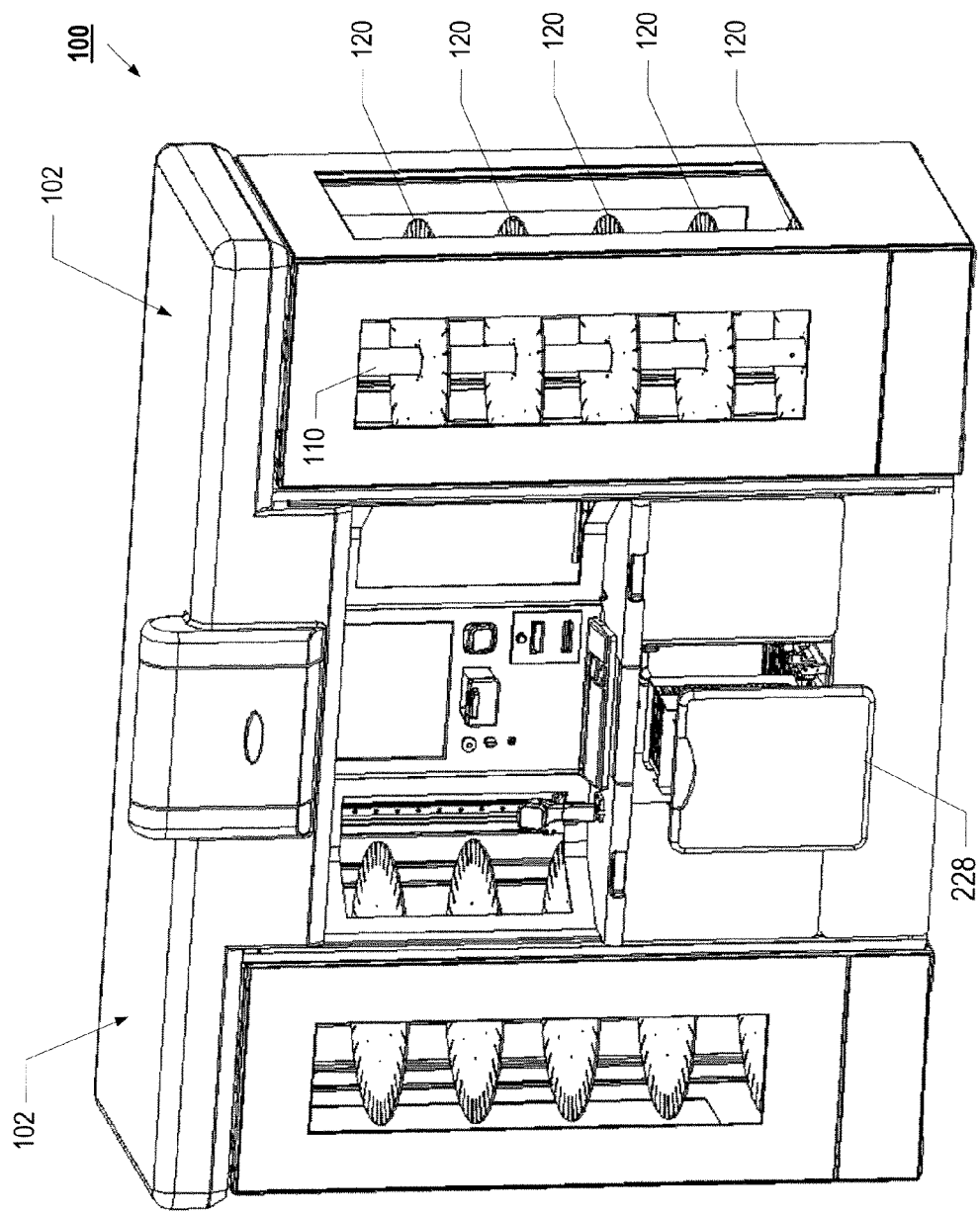
FIGS. 2 and 3 illustrate a storage, retrieval and delivery system in accordance with exemplary embodiments of the present invention.
Figure 3:
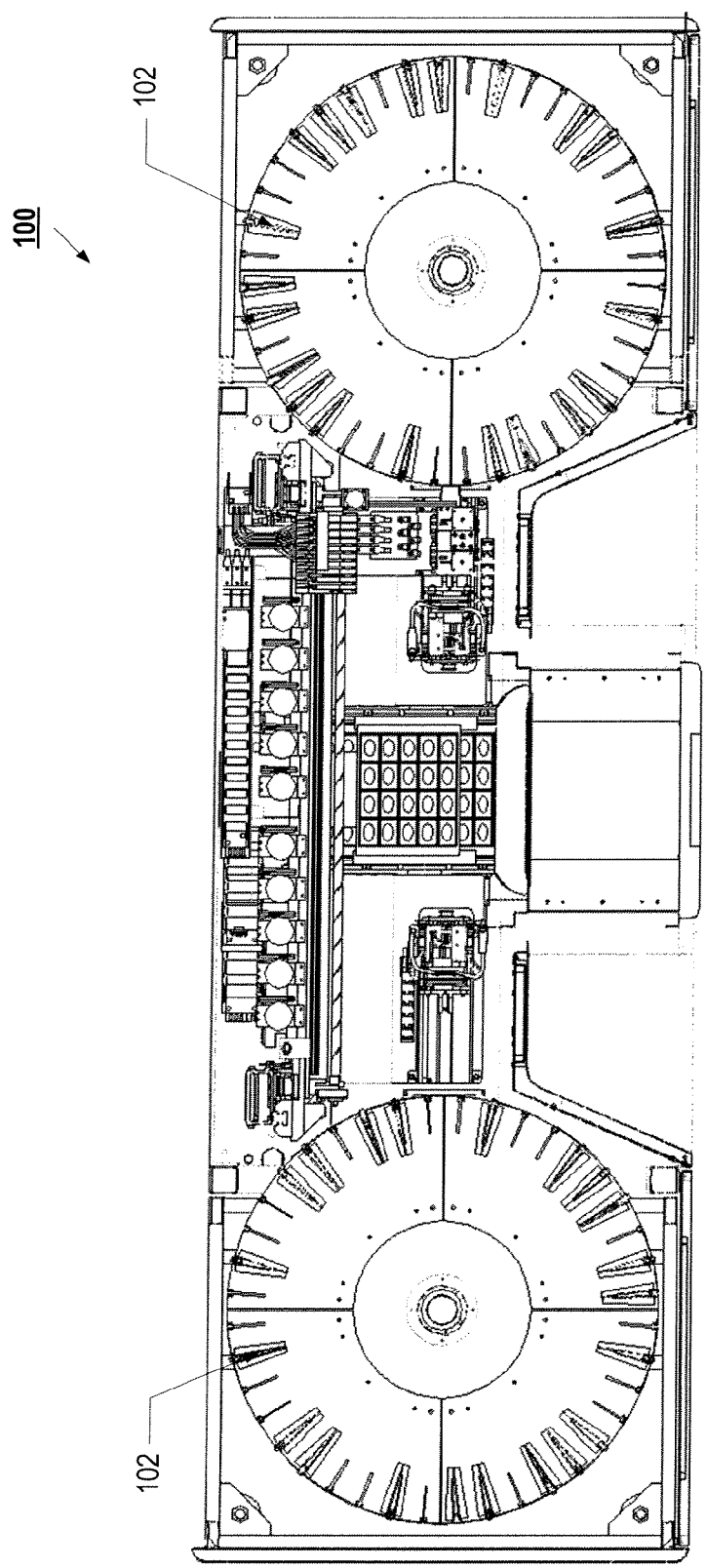

System:

Reference is now made to FIGS. 2 and 3, which illustrate one example of a storage, retrieval and dispensing system 100, in which exemplary embodiments of the present invention may be implemented. As one of ordinary skill in the art will recognize, the system 100 illustrated and described herein is just one manner in which the unit dose packages, or packages containing unit dose medications (e.g., unit dose blisters) may be handled in their natural or raw state (i.e. not over-wrapped or repackaged) in accordance with exemplary embodiments of the present invention. The system 100 of FIGS. 2 and 3 is provided for exemplary purposes only and should not be taken as limiting the scope of the invention in any way, since other systems may likewise be implemented without departing from the spirit and scope of the present invention.

The system 100 of exemplary embodiments may include a means for storing a plurality of unit dose blisters of various shapes and sizes, referred to herein as a "storage system" 102.

Figure 4:
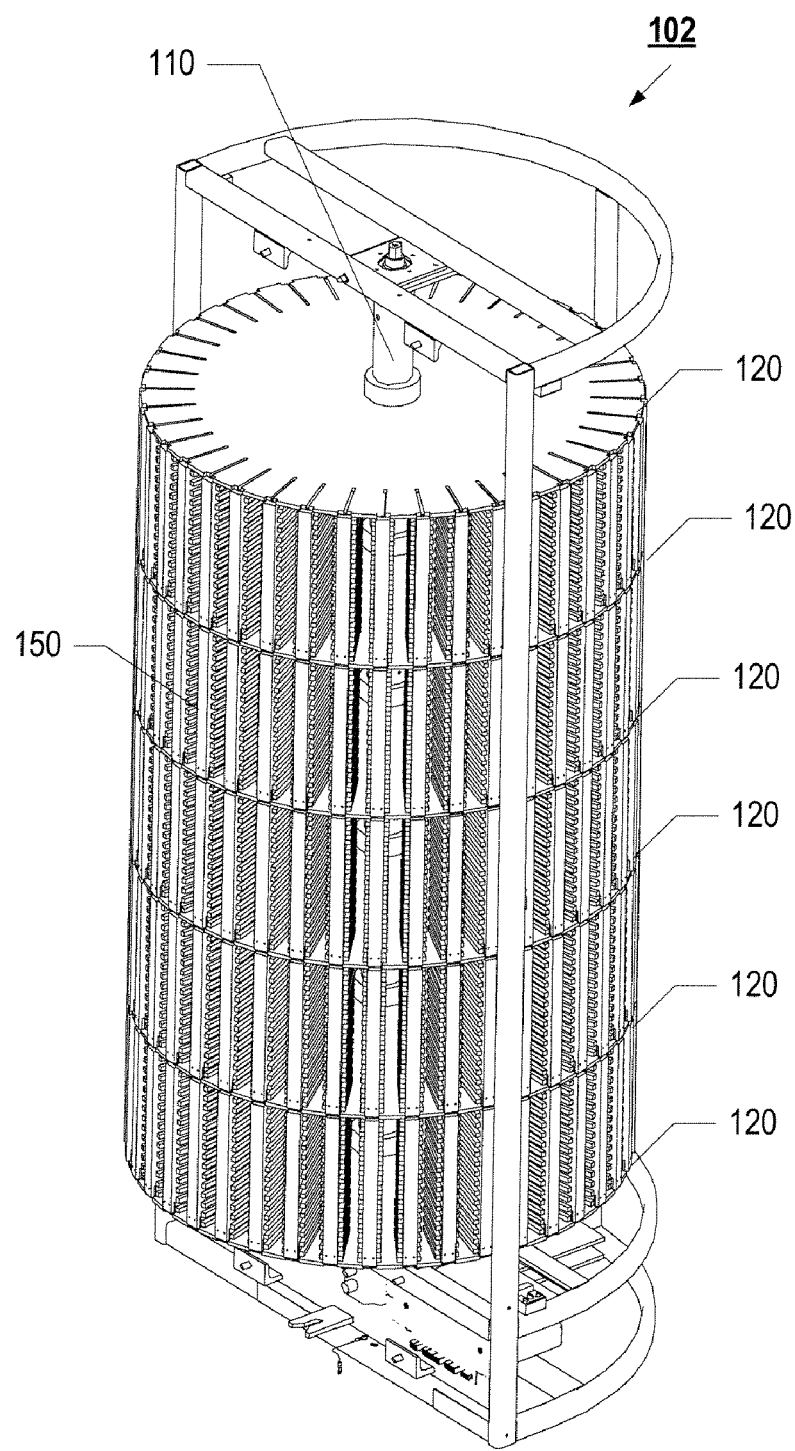
FIG. 4 illustrates a storage system in accordance with exemplary embodiments of the present invention.

As shown, the storage system 102 of one exemplary embodiment, which is also illustrated in FIG. 4, may be in the form of one or more carousels capable of rotating around a rod or pole 110 extending upward through the center of the carousel 102. While not shown, the storage system may, alternatively, comprise a linear track that is stationary and essentially resembles a plurality of pigeon holes or mail slots each including a unit dose package mount (e.g., a unit dose blister mount), which is described in detail below. Returning to FIGS. 2 and 3, the rod or pole 110 may be configured to support a plurality of circular panels 120 positioned at some distance from one another, wherein each panel is, in turn, configured to support a plurality of unit dose package mounts 140 (e.g., unit dose blister mounts) (not shown in FIG. 2 or 4), via a plurality of package mount receptacles 150 (e.g., blister mount receptacles—shown in FIG. 4).

In this regard, the blister mount receptacles 150 of one embodiment shown in FIG. 4 extend between adjacent panels 120 so as to define a plurality of wedge-shaped cavities. While the panels 120 could be spaced and the unit dose blister mounts 140 sized such that each wedge-shaped cavity defined by the blister mount receptacles 150 received a single unit dose blister mount 140, the storage system 102 of the illustrated embodiment is capable of storing a plurality of unit dose blister mounts 140 within each wedge-shaped cavity. In this regard, the blister mount receptacles 150 can include tracks for engaging corresponding grooves or other features defined by the unit dose blister mounts 140 such that multiple unit dose blister mounts 140 can be inserted into a single storage location, e.g., a single wedge-shaped cavity, in an organized manner.

Figure 10A:
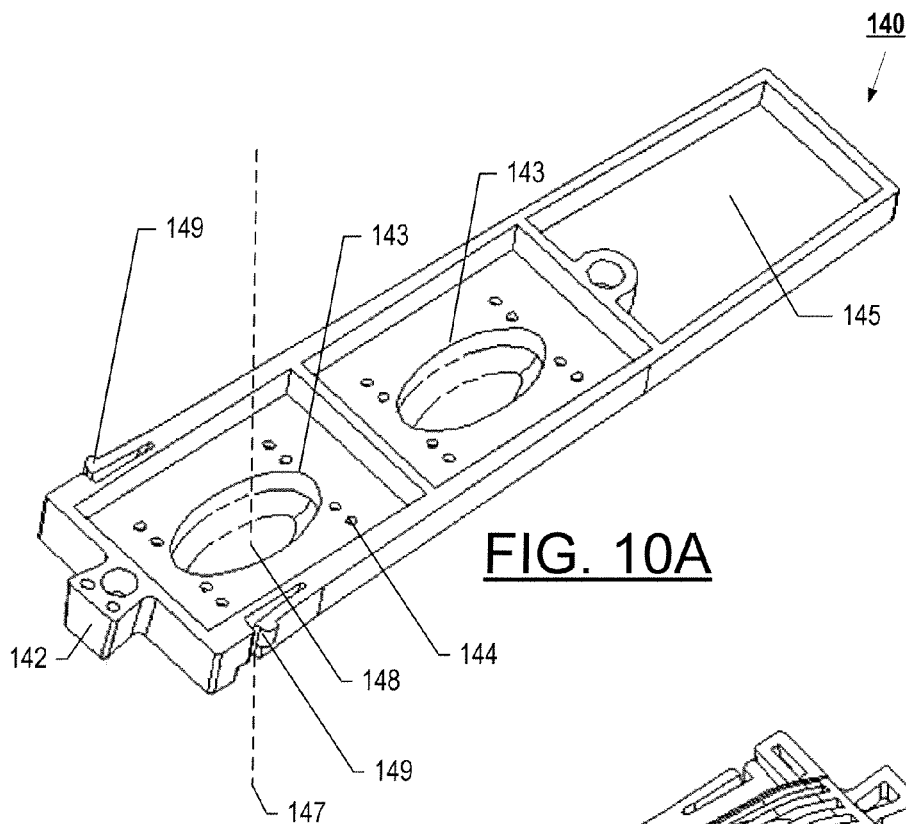
FIGS. 10-12 illustrate a unit dose blister mount according to exemplary embodiments of the present invention.
Figure 10B:
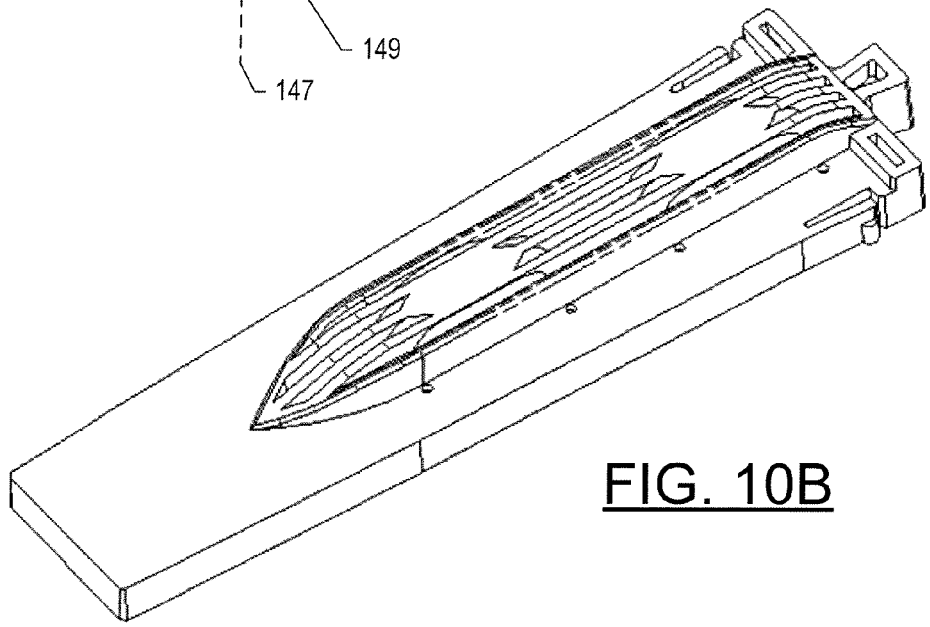
Figure 11:
Figure 12:

The unit dose blister mounts 140 of exemplary embodiments are each configured to position the plurality of unit dose blisters of various shapes and sizes in a predetermined, repeatable orientation within the storage system 102. In particular, the unit dose blister mounts 140 are configured to maintain respective unit dose blisters (or similar unit dose packages) in a predetermined plane relative to the unit dose blister mount 140. Exemplary embodiments of the unit dose blister mount 140 are illustrated in FIGS. 10-12, and will be discussed in further detail below. An exemplary storage system 102 may comprise two carousels each capable of holding 6,000 unit dose blisters, or similar unit dose packages, thus providing a means for storing up to 12,000 unit dose medications. To increase storage, in an alternative embodiment, not shown, the round carousel may be replaced with an oval-shaped carousel. In this exemplary embodiment, while the radius of the oval carousel may be the same as the circular carousel illustrated in FIGS. 2-4, the oval or race track shaped carousel would provide additional storage for blisters along the flat sections, thus enabling the storage per carousel to increase substantially.

As one of ordinary skill in the art will recognize, other means for storing a plurality of unit dose packages (e.g., unit dose blisters) in their natural, raw state may likewise be used without departing from the spirit or scope of the present invention. For example, the storage system 102 may resemble a vending machine, wherein the unit dose package mounts 140 comprise springs having a plurality of coils, each coil being capable of holding a unit dose package, such that when the spring is turned, the unit dose package at one end of the spring will be released. In one exemplary embodiment, the storage system 102 may include several rows and columns of such springs, or unit dose package mounts.

Figure 5A:
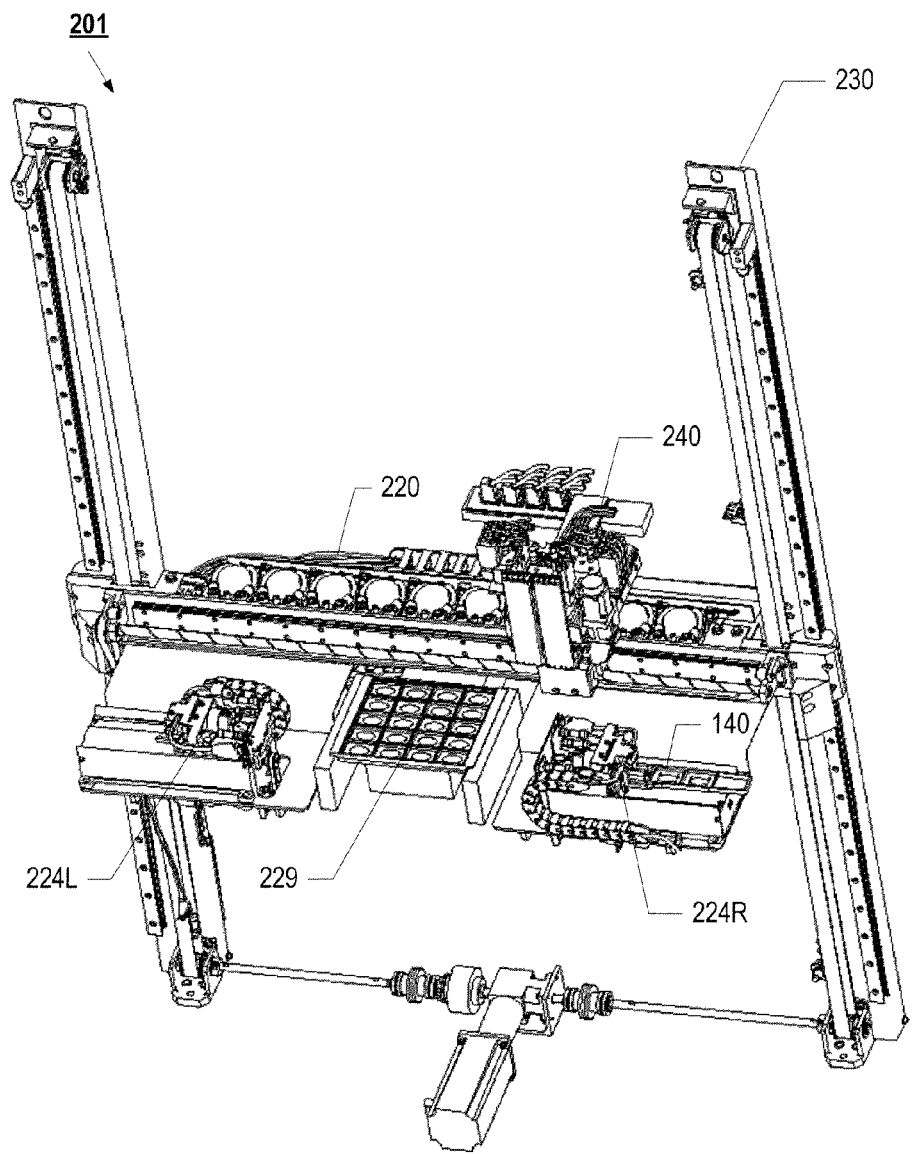
FIGS. 5A & 5B illustrate a picking system in accordance with exemplary embodiments of the present invention.
Figure 5B:
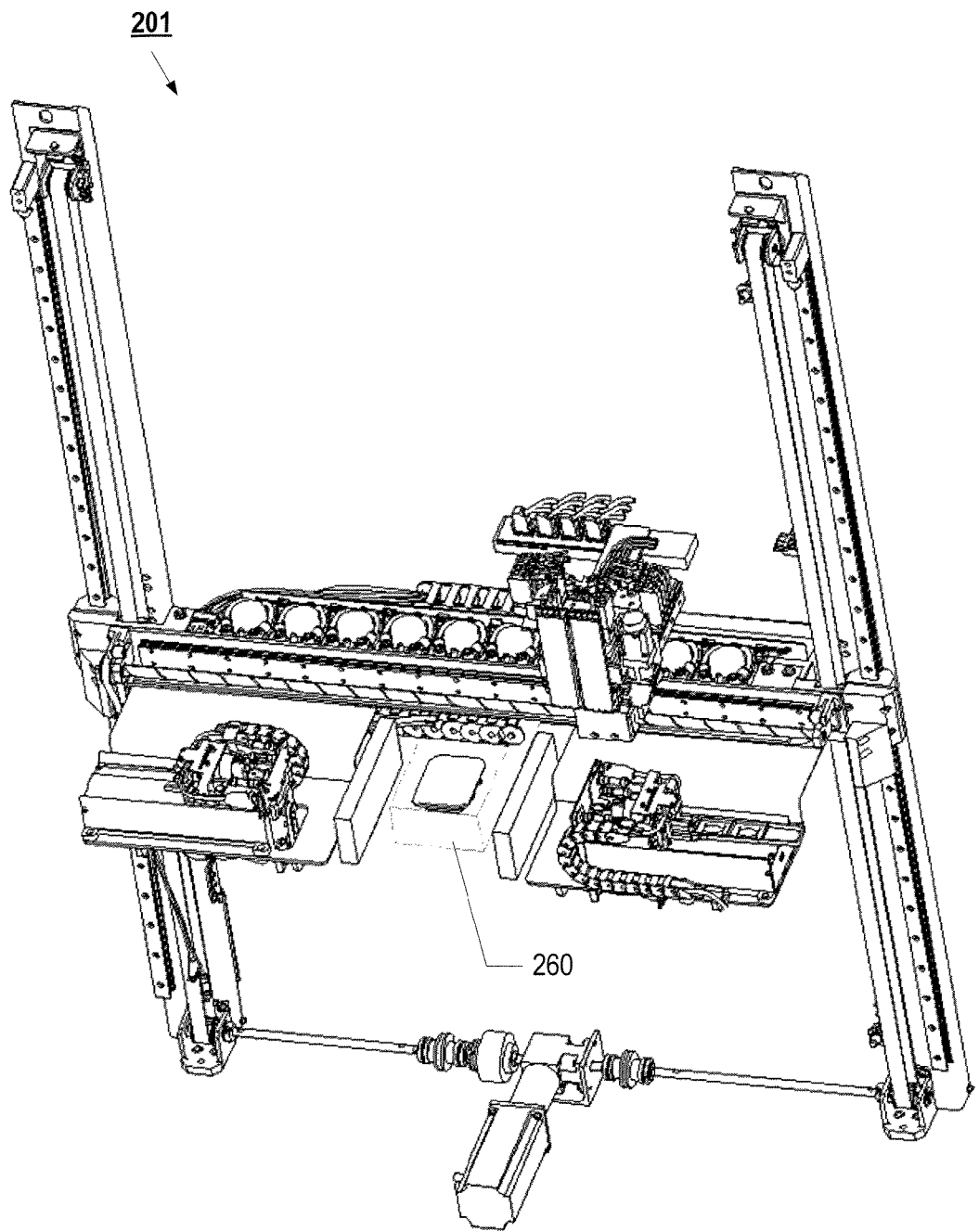

The system may further include a means for selectively retrieving a unit dose blister (or similar unit dose package) from the storage system and delivering the unit dose blister to a specified location, referred to herein as a "picking system" 201 (not shown in FIG. 2). The picking system 201 of one exemplary embodiment, which is illustrated in FIGS. 5A and 5B, may include X-Axis 220, Y-Axis 230 and Z-Axis 240 components configured to enable the picking system 201 to move in three, mutually orthogonal directions, designated X, Y and Z, in order to retrieve a unit dose blister, typically while disposed within a unit dose blister mount 140, from the storage system 102.

The Y-Axis component 230 may comprise one or more timing belts driven by a closed-loop motor and configured to move the X and Z-Axis components 220, 240 in the Y-direction (e.g., up and down). The X-Axis component 220 may, likewise, be driven by a closed-loop motor (e.g., a servo motor) to move linearly in the X-direction (e.g., left and right). In embodiments in which the unit dose blister is disposed within a unit dose blister mount while stored within the storage system 102, the X-Axis component 220 may include one or more cantilevered unit dose package (e.g., blister) mount removal mechanisms 224L, 224R (referred to herein as "mount removal mechanisms"), illustrated in FIG. 6A, which are configured to remove a unit dose blister mount 140 from the storage system 102 and present it to a blister removal mechanism 242, which is discussed in further detail below. Where, for example, the storage system 102 of the retrieval and delivery system 100 comprises two carousels, the X-Axis component may include both a left 224L and a right hand 224R mount removal mechanism.

Figure 6A:
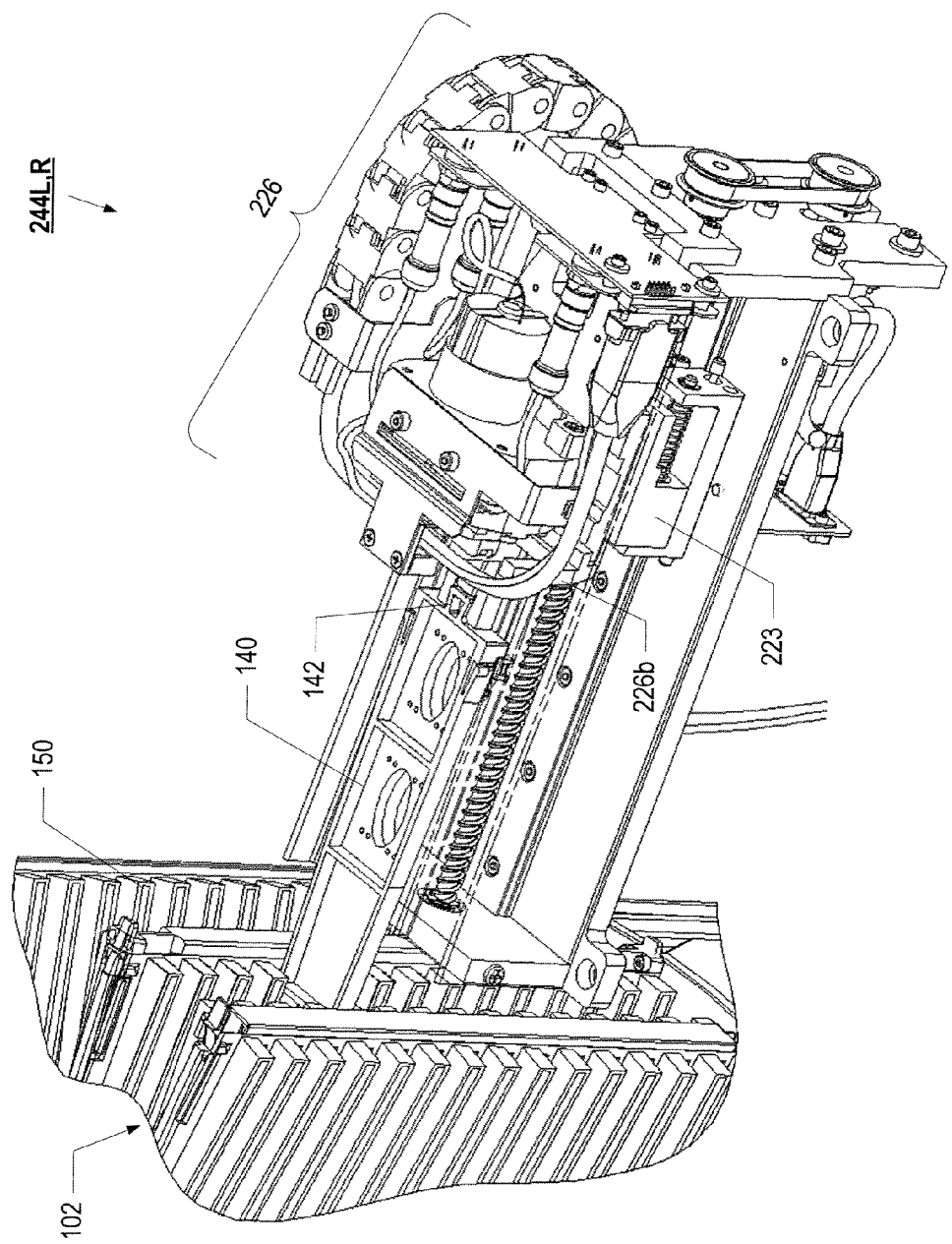
FIG. 6A illustrates a unit dose blister mount removal mechanism in accordance with exemplary embodiments of the present invention.

As shown in FIG. 6A, the mount removal mechanism 224L, 224R may comprise a gripper 226 capable of gripping the handle 142 of a unit dose blister mount 140. In one exemplary embodiment, the gripper is configured to grip the handle while off center, in other words, despite the fact that the gripper and handle are not completely aligned. The mount removal mechanism 224L, 224R may further include an extension and a retraction mechanism 223 configured to extend the mount removal mechanism 224L, 224R back and forth from the location of the unit dose blister mount 140 to the location where the unit dose blister mount 140 is presented to the blister removal mechanism 242. In other words, the mount removal mechanism 224L, 224R may be configured to move from a first position to a second position proximate the unit dose blister mount 140, to grip the handle 142 of the unit dose blister mount 140, and to then retract away from the second position, in order to present the unit dose blister mount 140 to the blister removal mechanism 242.

Figure 6B:
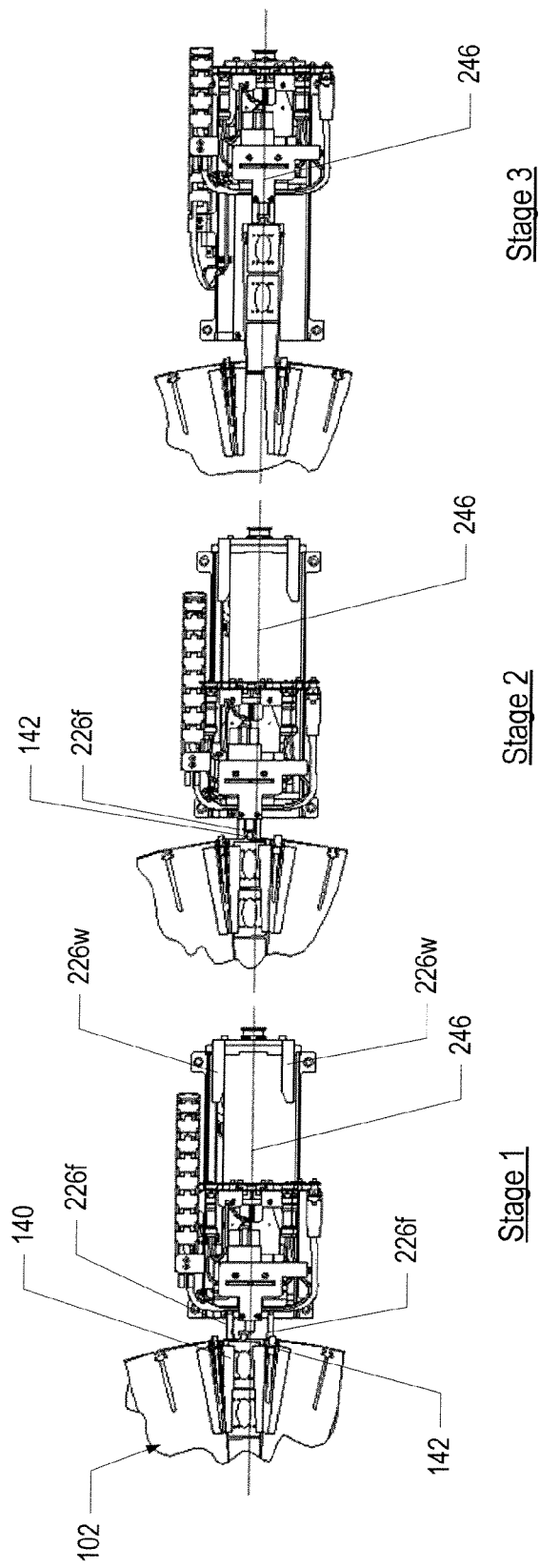
FIG. 6B illustrates removal of a unit dose blister mount in accordance with exemplary embodiments of the present invention.

FIG. 6B provides an illustration of this mount removal process in accordance with exemplary embodiments of the present invention. As shown, at the first stage, the mount removal mechanism 244L,R extends to a position proximate the storage system 102, such that the fingers 226f of the gripper 226 of the mount removal mechanism 244L,R are substantially flush with the unit dose blister mount 140, and the handle 142 of the unit dose blister mount 140 lies somewhere between those fingers 226f. As noted above, and as shown in Stage 1 of FIG. 6B, it is not necessary that the gripper 226 (or the mount removal mechanism 244L,R) align perfectly with the handle 142 of the unit dose blister mount 140 (or with the unit dose blister mount itself). In other words it is not necessary that the handle 142 lie directly in the center of the gripper fingers 226f. In particular, in one exemplary embodiment, the gripper 226 lies on a bearing (not visible in FIG. 6B) that enables the gripper to slide, or shift, in a direction substantially perpendicular to the centerline 246 of the mount removal mechanism 244L, R. As a result, as the gripper fingers 226f close on the handle 142 (Stage 2), the gripper 226 shifts in either direction perpendicular to the general motion of the mount removal mechanism 244L, R in order to comply with the centerline of the unit dose blister mount 140. As the gripper 226 then pulls the unit dose blister mount 140 from the storage system 102 (Stage 3), the gripper 226 is again free to float in either direction substantially perpendicular to the centerline 246 of the mount removal mechanism 244L, R until the gripper 226 reaches the gripper wrist 226w (or alignment bars), which brings the gripper 226 back to a known, repeatable position that is, for example, in alignment with the centerline 246 of the mount removal mechanism 244L, R. In other words, the gripper wrist 226w interacts with the gripper 226 in order to realign the gripper 226, and consequently the unit dose blister mount 140, in order to facilitate accurate identification capture and subsequent blister removal. In order for the unit dose blister mount 140 to more easily shift as the gripper 226 is pulling it 140 from the storage system 102, in one exemplary embodiment, the unit dose blister mount 140 is shaped as a wedge (as shown in FIGS. 10A and 10B), wherein the tail, or the end opposite the handle 142, is narrower than the end comprising the handle 142; thus enabling it to shift while still within or in contact with the storage system 102.

After the unit dose blister has been scanned and, possibly, removed from the unit dose blister mount 140, for example in the manner discussed below, the mount removal mechanism 244L, R will replace the unit dose blister mount 140 in the storage system 102. In particular, the gripper 226 disengages from the wrist 226w and is once again free to float back and forth in either direction substantially perpendicular to the centerline 246. As the mount removal mechanism 244L, R pushes the unit dose blister mount 140 back into the storage system 102, the unit dose blister mount 140 will guide itself into its nested position, and the gripper 226 will follow. Once the unit dose blister mount 140 is in place within the storage system 102, the gripper fingers 226f will open, or release the unit dose blister mount handle 142. As the fingers 226f are opening, the gripper 226 will again realign itself with the centerline 246 using another set of finger alignment bars 226b, which can be seen in FIG. 6A. In particular, the fingers 226f will open only until they come into contact with the finger alignment bars 226b, which will re-center the gripper 226 along the mount removal mechanism 244L, R centerline 246.

Figure 8A:
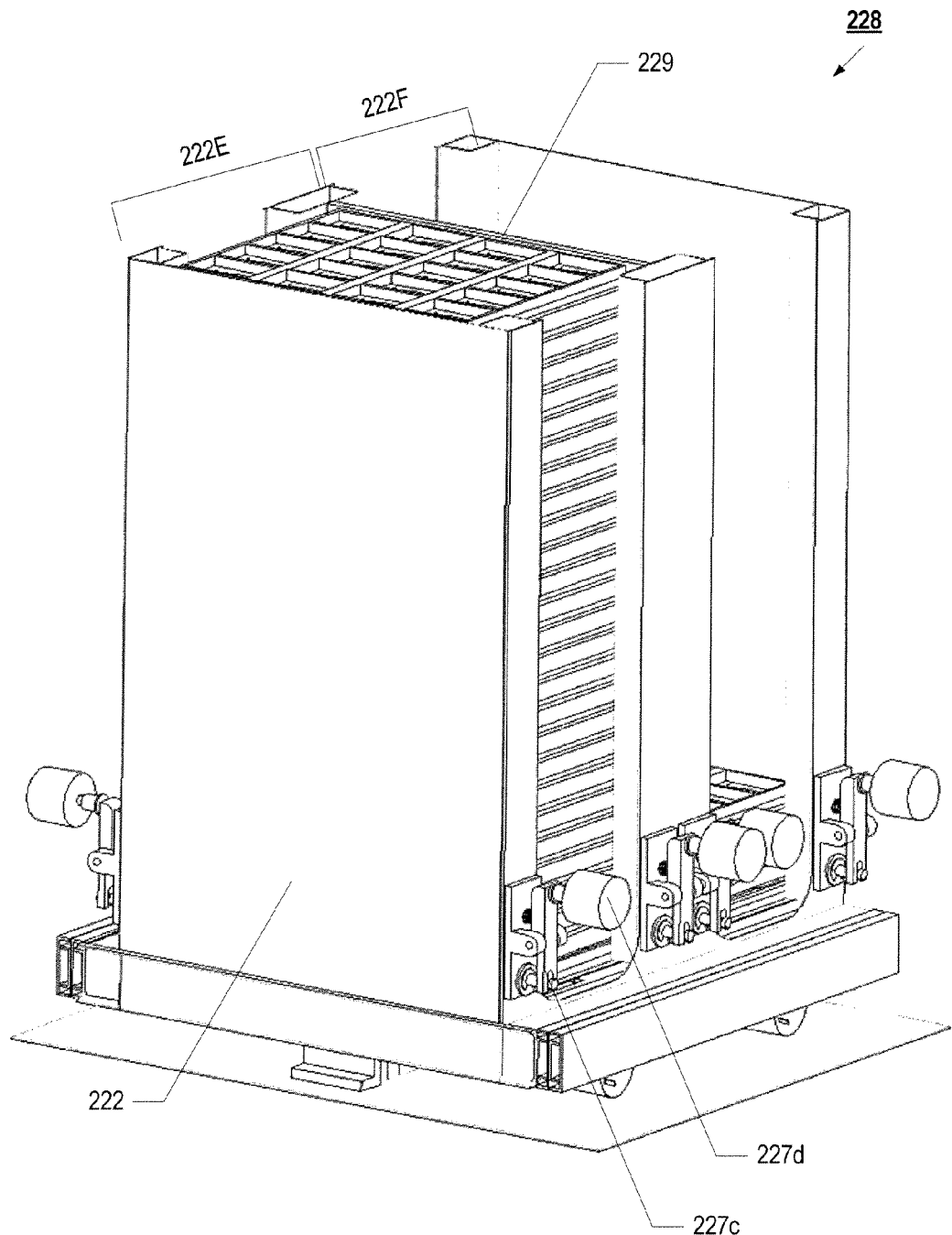
FIGS. 8A and 8B illustrate a tray delivery/removal mechanism in accordance with exemplary embodiments of the present invention.
Figure 8B:
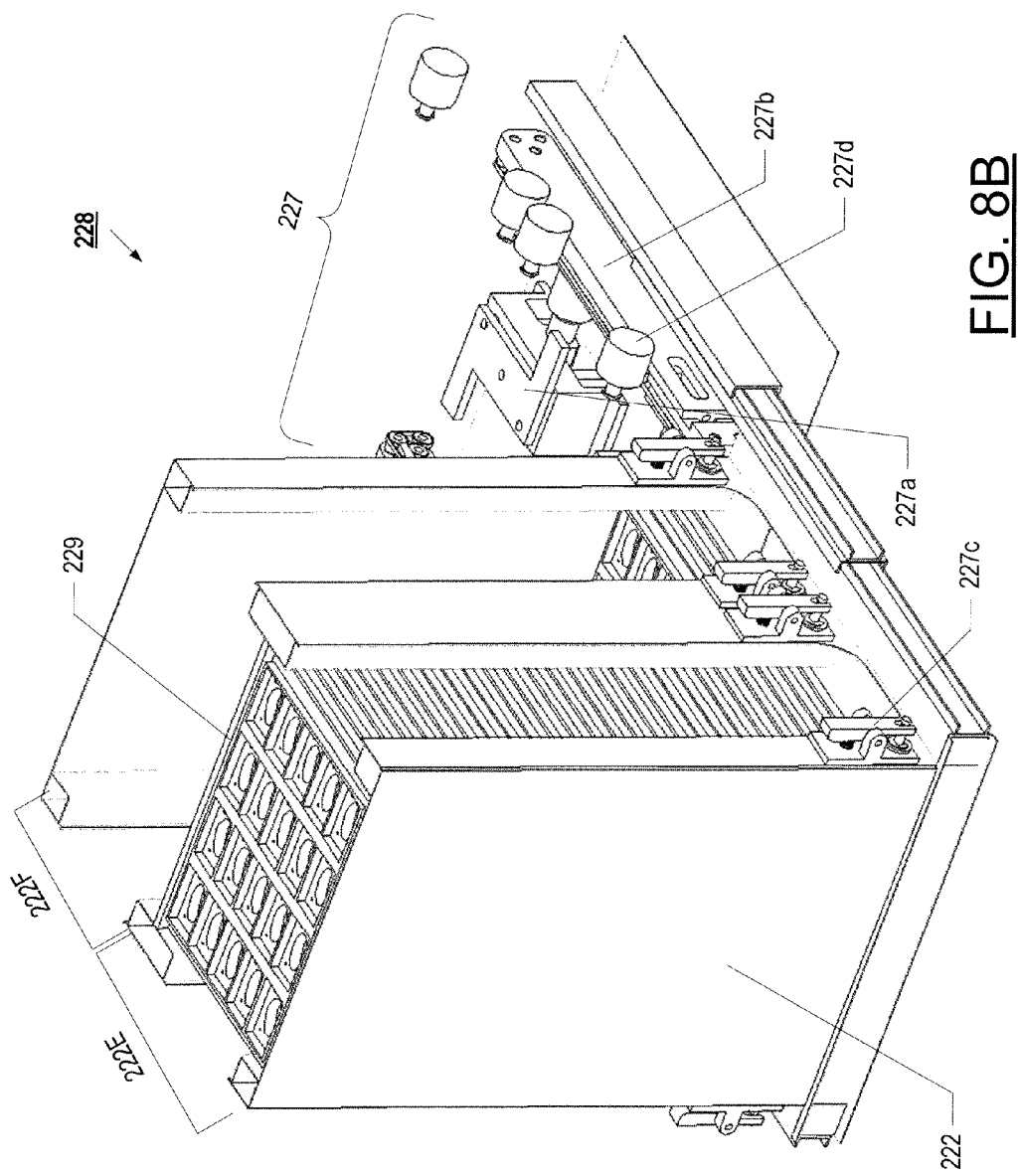

The X-Axis component 220 may further comprise one or more tray delivery/removal systems 228, shown in FIGS. 2, 8A and 8B, which may be used by the storage, retrieval and dispensing system 100 to restock the storage system 102 with unit dose blisters (or similar unit dose packages). As illustrated in FIGS. 8A and B, in one exemplary embodiment, the tray delivery/removal system 228 may comprise a drawer 222 that is capable of being opened (i.e., pulled away from the storage, retrieval and dispensing system 100 as shown in FIG. 8B) or closed (as shown in FIG. 8A) for the purpose of loading and unloading restock trays 229, and is divided into two sections 222F and 222E, wherein each section is configured to hold approximately 25 restock trays 229, each of which further configured to hold approximately 20 singulated unit dose blisters. The first section 222F may be used to hold restock trays 229 that are full of unit dose blisters and have been placed in the tray delivery/removal system 228, for example, by a technician for the purpose of restocking the storage system 102. In contrast, the second section 222E may hold empty restock trays 229, or trays from which the picking system 201 has already removed the unit dose blisters and placed them in the storage system 102.

To illustrate, in one exemplary embodiment, blisters received from an in-house or third party packager may be singulated (i.e., separated into unit doses) and then manually loaded into the restock trays 229. In addition, unit dose blisters that have been returned, for whatever reason, from a patient (or cabinet) may also be loaded into the restock trays 229. A pharmacy technician may then open the drawer 222, load the tray 229 (or stack of trays) into the first section 222F of the drawer 222, and then close the drawer 222 to enable the restocking process to begin. Once the first section 222F of the drawer 222 has been filled with restock trays 229 carrying unit dose blisters (or at any point when it is desired to restock the storage, retrieval and dispensing system 100), a tray removal system 227, essentially comprising a lifting mechanism 227a, a reversing conveyor 227b, a plurality of tray holding latches 227c and a corresponding plurality of tray holding latch actuators 227d will singulate the bottom tray 229 in the stack of trays in the full section 222F of the drawer 222, and transfer the singulated tray 229 to the picking system 201. In particular, in one exemplary embodiment, the lifting mechanism 227a will extend upward lifting the stack of trays 229 in the full section 222F of the drawer 222 off of the tray holding latches 227c, which are configured to hold the stack of trays 229. The tray holding latch actuators 227d can then be extended outward in order to retract the tray holding latches 227c, in other words, to remove the tray holding latches 227c from the bottom of the stack of trays 229. The lifting mechanism 227a can then retract or drop the height of one tray 229, and the tray holding latch actuators 227d can then be extended back inward in order to allow the tray holding latches 227c to extend under the stack of trays one tray 229 up from the bottom tray 229. Finally, the lifting mechanism 227a can lower the rest of the way, such that the tray holding latches 227c now support the remaining trays (i.e., the original stack of trays minus the bottom tray), and the singulated bottom tray now rests on the reversing conveyer 227b.

Once the singulated tray has been transferred to the picking system via the reversing conveyer 227b, the picking system 201 can then deposit each unit dose blister into a unit dose blister mount 140 at a specified location within the storage system 102. Once all of the unit dose blisters have been removed from the restock tray 229 the tray removal system 227 will transfer the empty tray 229 to the second section 222E of the drawer 222 (in a manner substantially opposite that discussed above with respect to singulation of the bottom full tray), from which it can be removed by a technician upon opening the drawer 222. In one exemplary embodiment, the system 100 may further include a means for singulating the various unit dose blisters prior to or after placing them in the tray delivery/removal system 228, thus eliminating the need for the pharmacy technician to manually singulate the blisters.

Figure 7A:
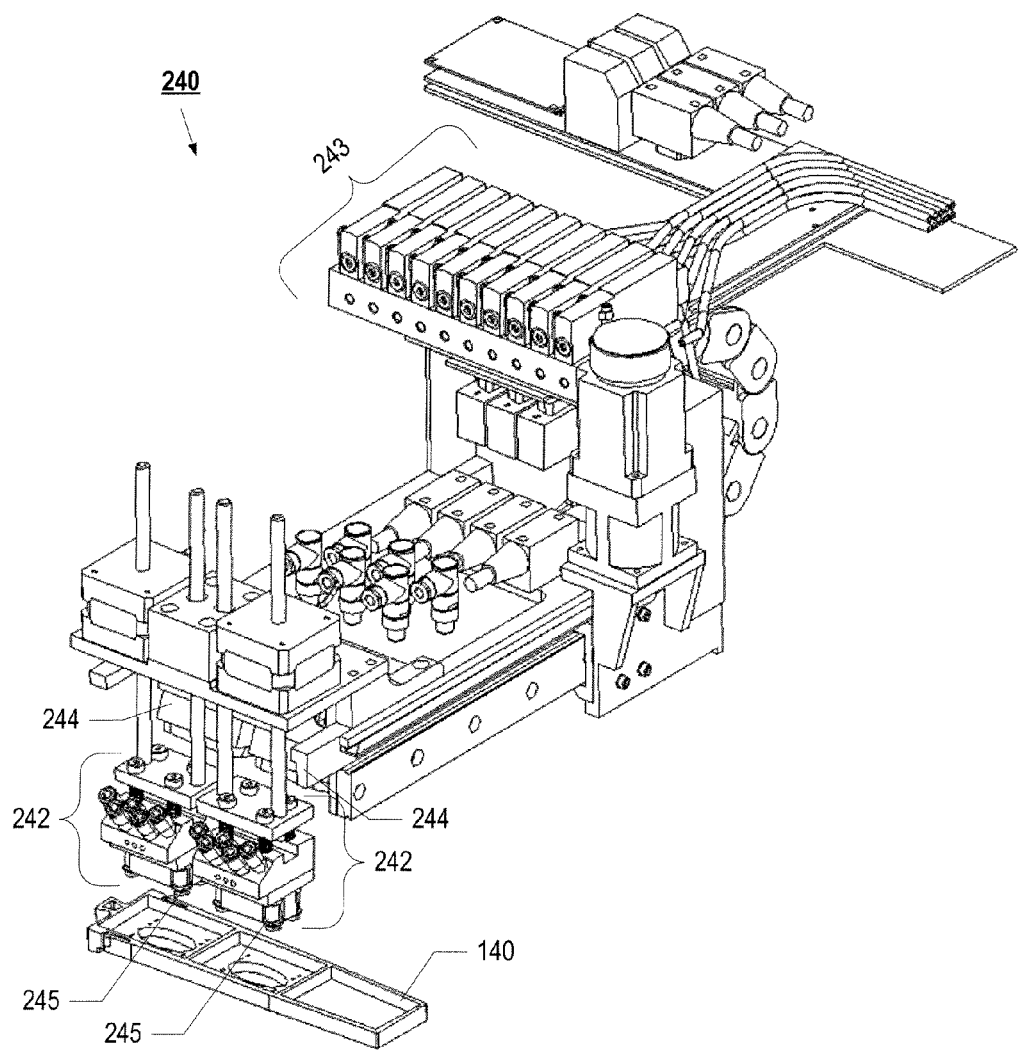
FIG. 7A illustrates the Z-Axis component of a picking system in accordance with exemplary embodiments of the present invention.

Returning to FIG. 4A, the Z-Axis component 240 of the picking system 201, which is shown in more detail in FIG. 7A, may comprise one or more unit dose package (e.g., blister) removal mechanisms 242 configured to remove one or more unit dose blisters from a unit dose blister mount 140 when the unit dose blister mount 140 has been presented to the blister removal mechanism 242. The blister removal mechanism 242 may likewise be configured to remove unit dose blisters from the restock trays 229 during the restocking process described above in conjunction with the tray delivery/removal system 228. In one exemplary embodiment, the blister removal mechanism 242 comprises one or more vacuum generators 243 capable of generating a sufficient suction to remove the unit dose blister from the mount 140 or tray 229, for example using one or more vacuum cups 245, and to hold the unit dose blister until it can be deposited in a specified location, such as a container that is associated with the overall system 260 (shown in FIG. 5B) and from which the unit dose blister may, for example, be dispelled from the back of the system into a patient-specific medication container, or a floor stock container (discussed below) or out a chute in the front of the system, for example, for the purpose of filling a patient first dose (i.e., not as part of a routine fill process).

In one exemplary embodiment, the vacuum generators are capable of generating a local vacuum through the use of one or more diaphragm electric pumps capable of being turned on and off. In particular, rather than requiring the use of compressed air, which can be costly, inefficient and fairly disruptive in terms of the noise and required piping associated with the use of an air compressor, the system of exemplary embodiments of the present invention uses one or more electric vacuum generators (e.g., of the form described and available at http://www.knf.com/oemair.htm) to produce a local vacuum, thus eliminating the need for compressed air and enabling the storage, retrieval and delivery system to essentially be moved into a facility and plugged into an electric power outlet in the wall.

Figure 7B:
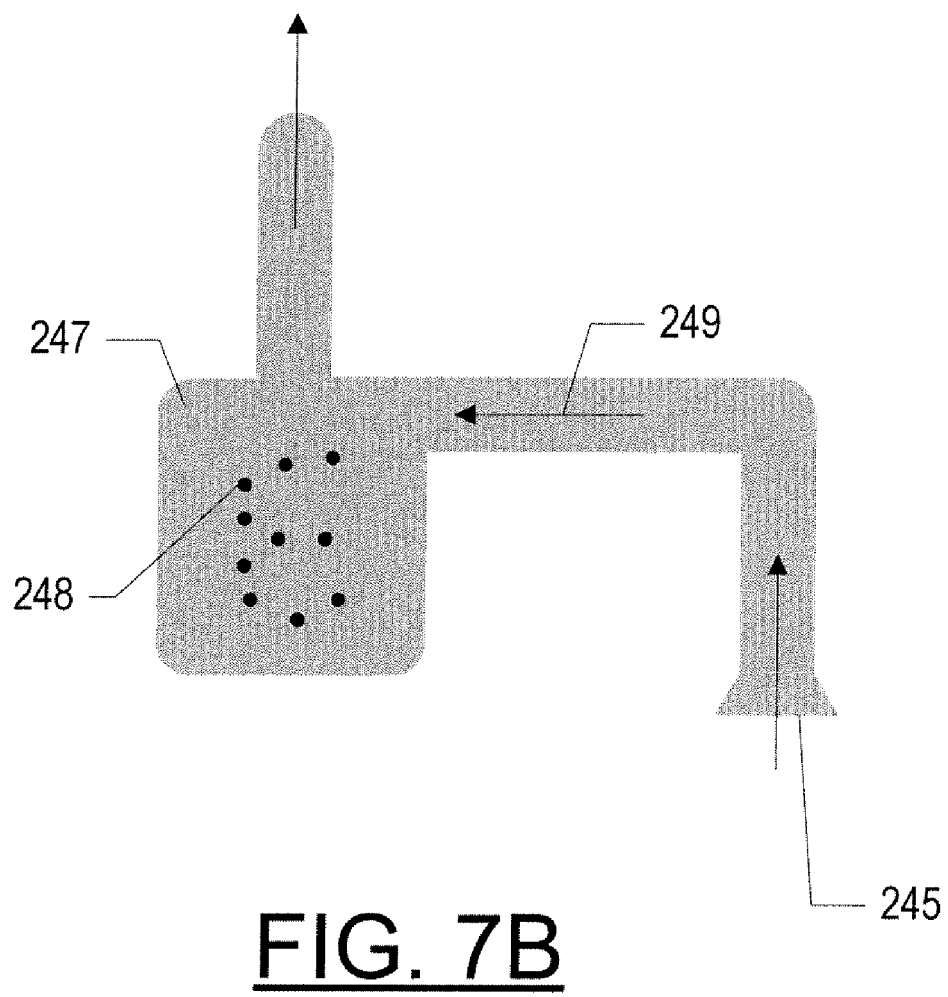
FIG. 7B illustrates a vacuum pump having an offset cavity for filtering air particles in accordance with exemplary embodiments of the present invention.

In addition, in another exemplary embodiment, each pump includes an offset cavity 247 used to filter the air coming through the vacuum pump, as illustrated in FIG. 7B. In particular, when air and particles 248 (e.g., dust or other particles lifted from the unit dose blister) flowing through the vacuum at a high velocity reach the cavity 247, the velocity of the particles 248 slows down and the particles 248 begin to gather in the cavity 247. Because the cavity 247 is slightly offset from the air flow 249, these particles 248 are removed from and no longer obstruct the desired air flow.

As one of ordinary skill in the art will recognize, while the foregoing provides one means for selectively retrieving and delivering unit dose blisters, other means may similarly be used without departing from the spirit and scope of the present invention.

Moreover, the retrieval and dispensing system 100 may further include one or more readers 244, including, for example, barcode or radio frequency identification (RFID) tag readers, cameras, or the like, capable of reading the identification code 40 displayed on the unit dose blister located in the unit dose blister mount 140 and communicating the information obtained (e.g., the identity of the unit dose medication, or one or more oral solids, held by the unit dose blister) to a controller associated with the storage, retrieval and delivery system 100, for the purpose of verifying that the correct medication has been selected. As shown in FIG. 7A, the one or more code readers 244 can be carried by the Z-Axis component 240.

In one exemplary embodiment, a special scanning technique may be employed in order to ensure that the identification code is accurately read, despite the fact that, other than the plane in which the identification code lies, the specific orientation of the identification code is not known. In particular, while exemplary embodiments of the present invention provide an apparatus that is configured to hold the unit dose packages so that they lie in a predetermined plane (e.g., substantially parallel to the surface of the apparatus), the apparatus does not dictate how the unit dose package is otherwise oriented within that plane. In some instances, for example where the identification code is not omnidirectional (i.e., capable of being read from any direction), however, in order to read the identification code, its orientation must be determined. One way to determine the orientation has been to repeatedly scan the unit dose blister (or similar object) from left to right, top to bottom, and then diagonally at various angles, for example, at five degree increments. However, this process can be very time consuming and is still not guaranteed to locate or accurately scan the identification code where, for example, the identification code does not happen to be at one of the angles scanned.

Exemplary embodiments of the present invention provide an improved manner of determining the orientation of the identification code that relies on the fact that, where the unit dose package comprises a unit dose blister having a rectangular support panel, as discussed above, the identification code is parallel to two sides of the support panel (See FIG. 1). According to exemplary embodiments of the present invention, the code reader 244 first locates the edges of the unit dose blister, for example, based at least in part on the contrast of color or darkness between the unit dose blister and the unit dose blister mount (which can be seen in FIG. 12, discussed below). The scanner or code reader 244 will then begin scanning in directions parallel the edges of the unit dose blister until it locates the identification code. Because this method greatly reduces the number of directions in which the code reader 244 must scan, exemplary embodiments of the present invention greatly reduce the time required to locate and scan the identification code where the orientation of the identification code is unknown.

In addition to the foregoing, another issue that often arises when attempting to scan or read identification codes is the amount of light that is reflected off the item being scanned. In particular, where the code reader 244 is placed directly above the unit dose blister, too much light may be reflected off the unit dose blister, preventing the identification code from being accurately read. One solution to this issue is to offset the code reader 244 slightly to the left or right of the center of the item being scanned (e.g., the unit dose blister), such that the light comes down at an angle from the code reader 244 and is, therefore, reflected away from the code reader 244 upon reaching the unit dose blister. This solution, however, may cause additional problems, since the orientation of the identification code is not constant and, therefore, the identification codes may have different focal distances (i.e., different distances between where the light is emitted from the code reader 244 and the point on the unit dose blister where the identification code can be read). The result is that, even though the code reader 244 may scan over the identification code, the identification code may not be in focus and, therefore, may not be able to be read accurately. This additional problem may be solved by exemplary embodiments of the present invention by automatically changing the focal distance as the code reader 244 repeatedly scans the unit dose blister until it locates and identification code and is able to accurately read it.

Figure 9:
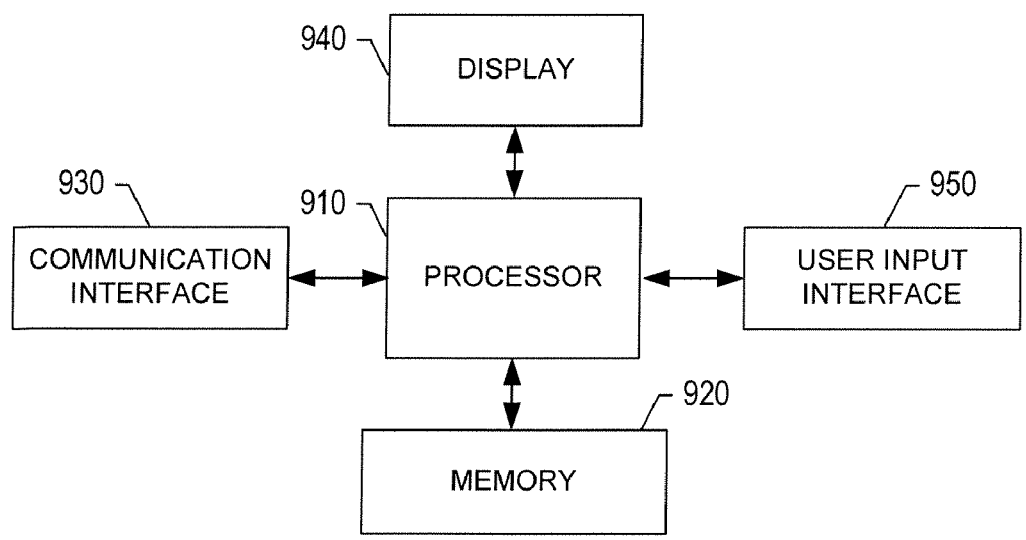
FIG. 9 is a block diagram of a controller, or similar electronic device, capable of performing various functions as part of a storage, retrieval and delivery system in accordance with exemplary embodiments of the present invention.

The storage, retrieval and delivery system 100 of exemplary embodiments may further comprise a controller, or similar processing device, capable of directing the picking system 201 to retrieve and deliver the necessary unit dose blisters in order to fill a patient's prescription order. FIG. 9 is a block diagram of a controller, or similar processing device, capable of operating in accordance with an exemplary embodiment of the present invention. As shown, the controller may include various means for performing one or more functions in accordance with exemplary embodiments of the present invention, including those more particularly shown and described herein. It should be understood, however, that the controller, or similar processing device, may include alternative means for performing one or more like functions, without departing from the spirit and scope of the present invention. As shown, the controller can generally include means, such as a processor 910 connected to a memory 920, for performing or controlling the various functions of the controller. The memory can comprise volatile and/or nonvolatile memory, and typically stores content, data or the like. For example, the memory typically stores content transmitted from, and/or received by, the controller. Also for example, the memory typically stores software applications, instructions or the like for the processor to perform steps associated with operation of the controller in accordance with embodiments of the present invention.

In one exemplary embodiment, the memory 920 stores a location associated with respective unit dose packages (e.g., unit dose blisters) stored within the storage system 102 of the retrieval and dispensing system 100. For example, the memory 920 may store the X, Y and Z coordinate for each unit dose blister currently stored in the system 100. In addition, the memory 920 may store one or more prescription orders, wherein each order includes an identification of a patient (e.g., a unique identification number) and a corresponding description of one or more medications needed by that patient for a given period of time. The memory 920 may further store a software application capable, upon execution by the processor 910, of determining one or more unit dose medications corresponding with a particular patient, determining the location of each medication, and directing the picking system 201 to retrieve and verify each of the needed medications.

In one exemplary embodiment, the memory may further store computer program code for optimizing the placement of unit dose packages in the storage system and of continuously updating and re-optimizing that placement. To illustrate, in one exemplary embodiment, statistical data may be gathered and analyzed in order to determine which medications (e.g., type, brand, dosage, etc.) are used most frequently at a given time. Unit dose packages containing these medications may, in turn, be placed in close proximity to one another, thus reducing the amount of movement required by the picking system within any given period of time. The next most frequently used medications may further be placed, for example, along the outside perimeter of the region where the most frequently used medications have been placed, and so on and so forth. Because certain medications are more popular at certain times (e.g., flu season), in one exemplary embodiment, the statistical data may be periodically updated in order to enable the placement of the unit dose packages to be continuously re-optimized.

In addition to the memory 920, the processor 910 can also be connected to at least one interface or other means for displaying, transmitting and/or receiving data, content or the like. In this regard, the interface(s) can include at least one communication interface 930 or other means for transmitting and/or receiving data, content or the like, as well as at least one user interface that can include a display 940 and/or a user input interface 950. The user input interface, in turn, can comprise any of a number of devices allowing the controller to receive data from a user, such as a keypad, a touch display, a joystick or other input device.

Storage Apparatus:

Reference is now made to FIGS. 10-12, which illustrate one example of a unit dose package mount 140 and, in particular, a unit dose blister mount, which may be used in order to position a unit dose package (e.g., unit dose blister), in its natural/raw state (i.e., not over-wrapped or repackaged), in a repeatable, predetermined orientation (i.e., in a predetermined plane) so that it can be selectively retrieved and delivered in accordance with exemplary embodiments of the present invention. In particular, the unit dose blister mount 140 of exemplary embodiments is configured to accept a plurality of different types of unit dose blisters of various shapes and sizes. As one of ordinary skill in the art will recognize, the unit dose blister mount 140 illustrated and described herein is just one example of a storage apparatus capable of accepting unit dose packages of various shapes and sizes and should not be taken as limiting the scope of the present invention.

Figure 10C:
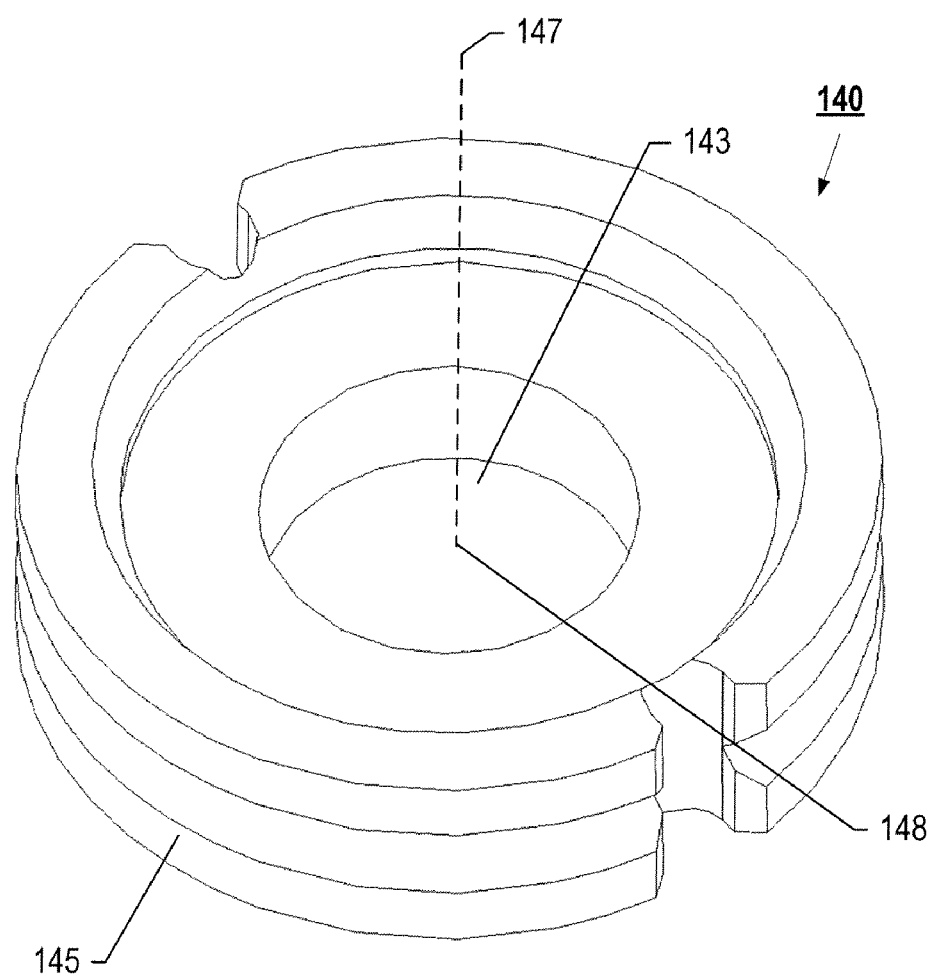

As shown in FIGS. 10A, 10B and 10C, the unit dose blister mount 140, also referred to herein as a "storage apparatus," of one exemplary embodiment may include a carrier 145 defining one or more cavities 143 therein, wherein each cavity is configured to receive the unit dose medication (i.e., the one or more oral solids of the same or different strength, form or type) of a unit dose blister while the support panel of the unit dose blister lies and is maintained in a predetermined plane relative to the carrier (as shown in FIG. 12). In particular, in one exemplary embodiment, the carrier 145 includes a surface, through which the one or more cavities 143 open. In this embodiment, each cavity 143 may receive the unit dose medication in such a way that the support panel of the unit dose is supported by the surface of the carrier 145 in a plane substantially parallel to the surface of the carrier. In this regard, the unit dose medication is generally disposed within the cavity 143 while the corners or other peripheral portions of the support panel contact and are supported by the carrier 145. In another exemplary embodiment, where the depth of the medication cavity of the unit dose blister is greater than the depth of the cavity 143 defined by the carrier 145, the unit dose medication is in contact with the carrier 145 (i.e., at the floor of the cavity 143), while the support panel is suspended just above the surface of the carrier, but remains in a plane substantially parallel to that surface.

The size, shape and depth of the cavities 143 of one exemplary embodiment were determined to accommodate a large sampling of unit dose blisters of various shapes and sizes. In particular, a compilation of the various sizes and shapes of a large number of unit dose blisters was analyzed. From the measurements of these unit dose blisters it was determined, among other things, how large the cavity 143 would need to be in order to receive at least a majority of the unit dose medications packaged in the unit dose blisters, and, on the other end of the spectrum, how small the cavity 143 would need to be in order to prevent the majority of unit dose blisters from falling entirely into the cavity. In one advantageous embodiment shown in FIGS. 10A and 10B, the carrier 145 may be configured to hold two unit dose blisters, wherein each cavity 143 has an elliptical shape with major and minor dimensions of 1.25 inches and 0.625 inches, respectively. FIG. 10A provides a top or overhead perspective of the unit dose blister mount of exemplary embodiments, while FIG. 10B provides the bottom perspective. In an alternative embodiment shown in FIG. 10C, the carrier may be configured to hold a single unit dose blister using a circular cavity having a diameter of 1.1 inches.

While carriers and cavities having two different shapes and sizes have been shown, the carrier 145 can define other cavities 143 having still different shapes and sizes and may itself comprise different shapes and sizes in accordance with other embodiments of the present invention. Exemplary carriers may further not define a cavity at all, as in the example discussed above wherein the carrier comprises a spring having a plurality of coils, each configured to hold a unit dose package.

According to exemplary embodiments of the present invention, the unit dose blister is able to naturally sit in the storage apparatus 140, or unit dose blister mount, with its medication cavity down (e.g., where the storage apparatus 140 comprises the carrier 145 illustrated in any of FIGS. 10-12, the cavity 143 of the carrier 145 may receive the unit dose medication). This orientation will position the unit dose blister to lie substantially flat in a plane defined by the storage apparatus 140 (e.g., the carrier 145), such as the horizontal plane, having its identification code and other printed drug information (i.e., the information displayed on the second side of the support panel of the unit dose blister) viewable from above. Because of this orientation, using the scanning technique discussed above, the picking system 201 of a storage, retrieval and delivery system 100 can reliably read the barcode, or similar identification code, on the medication without having to reorient the medication in any way.

In addition, this position and containment offers a consistent, reliable means for the picking system 201 to vacuum pick (e.g., using the blister removal mechanism 242) the unit dose blister during the retrieval and delivery process. Alternatively, removing the unit dose blister may be done by flipping the storage apparatus 140, or unit dose blister mount, over, allowing the unit dose blister to fall into a predetermined location (e.g., a container from which the unit dose blister may be dispelled out the front or back of the system into, for example, a patient-specific medication bin or container or a floor stock container). In this exemplary embodiment, the picking system 201 may never have to even contact the unit dose blister directly during the retrieval and delivery process. Where, for example, the unit dose blister is removed from the storage apparatus 140 using the one or more vacuum generators and vacuum cups, the storage apparatus 140 may further comprise one or more holes 144 (shown in FIG. 10A) strategically located below where the vacuum cups contact the storage apparatus 140, wherein the holes are designed to prevent the vacuum cups from sealing to the storage apparatus 140 and preventing the unit dose blister from being removed.

In one exemplary embodiment, the unit dose blister mount 140, or storage apparatus, is designed such that a free floating unit dose blister cannot flip, rotate more than 45° in either direction from a centered position in which the medication is centered within the cavity, or move past the centerline 147 of the cavity 143 (i.e., a line extending through the center 148 of the cavity 143 in a direction perpendicular to the unit dose blister mount 149), once the unit dose medication of the unit dose blister has been received by the cavity 143. Thus, while the position of the identification code carried by the unit dose blister will vary somewhat, the range of possible positions of the identification code is sufficiently limited and the identification code remains in substantially the same plane (defined by the carrier 145) when in any of the possible positions such that the identification code can consistently be read by the identification code reader.

Figure 13:
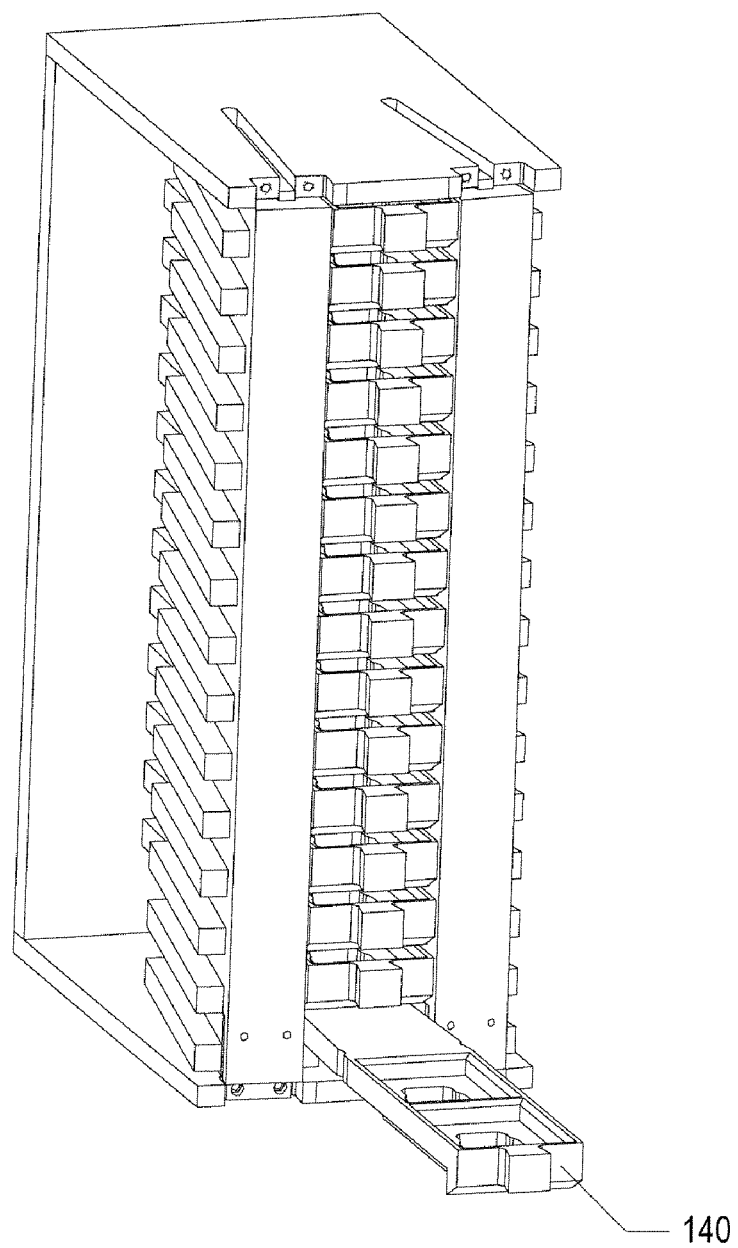
FIG. 13 illustrates the partial removal of a unit dose blister mount from a storage system in accordance with exemplary embodiments of the present invention.

As shown in FIG. 13, the storage apparatus 140 of one exemplary embodiment, may act as a drawer for the unit dose blisters. In other words the storage apparatus 140 is capable of being pulled from its nested position within the storage system 102 with one linear movement.

Figure 14:
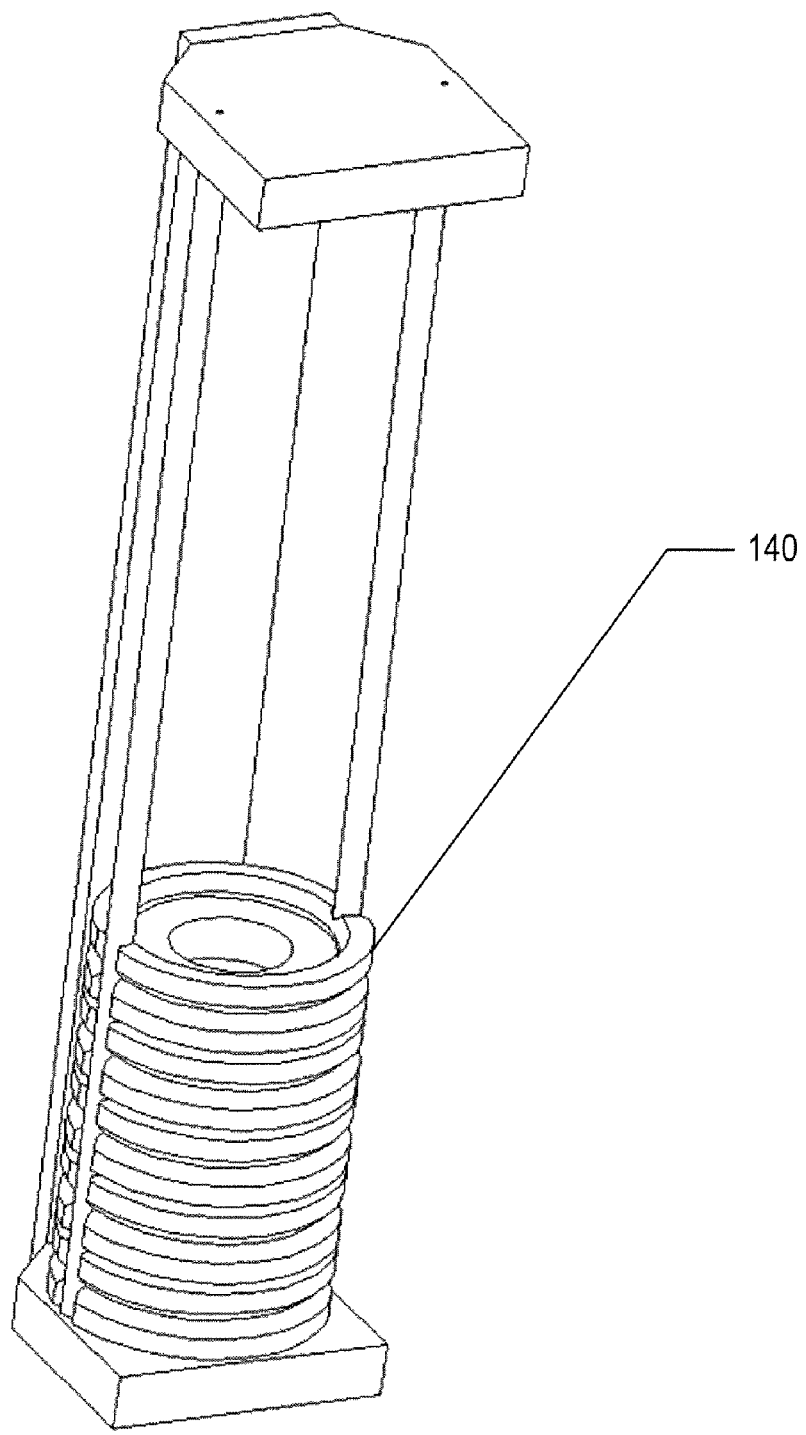
FIG. 14 illustrates a method of storing unit dose blister mounts according to one exemplary embodiment of the present invention.

As noted above, the storage apparatus 140 may include a single cavity, or several cavities, each configured to receive a plurality of different types of unit dose medications. An advantage to having only one cavity is that each unit dose blister in the system, whether being stored or transported, is located in its own reusable container. Single-cavity storage apparatuses also lend themselves well to storing, as shown in FIG. 14, which illustrates one method of storing single-cavity storage apparatuses of the shape illustrated in FIG. 10C. As shown, the small size of a single-cavity storage apparatus lends itself well to stacking in, for example, a tube; thus offering dense storage where like medications may be grouped. Alternatively, the small single-cavity storage apparatuses may be separated by dividers and stored in an array of pigeon holes (i.e., mail slots), in which the picking system 102 may have random access in order to remove any single storage apparatus 140 at any given time. In order to increase the storage density, the pigeon hole may closely match the profile of the storage apparatus 140. The picking system 201 may, in this exemplary embodiment, be required to remove the storage apparatus 140 from the pigeon hole prior to dispensing the unit dose blister, rather than inserting, for example, the blister removal mechanism 242 into the pigeon hole to retrieve the medication.

By contrast, an advantage to a multiple-cavity storage apparatus 140 may be that the picking system 102 not only has random access to the single dose medications via the pigeon hole configuration described above, but the picking system 102 would have the additional ability to pick more than one medication at a time. As the number of cavities in a storage apparatus increases, other additional advantages may come into play, such as the fact that the storage apparatuses can be batched into large groups increasing the storage, retrieval and delivery system's 100 throughput.

The storage apparatus 140 of one exemplary embodiment may further include an identification marker (not shown), such as a barcode or radio frequency identification (RFID) label or tag that is configurable to correspond to the medication(s) housed therein. In addition, the storage apparatus 140 of another exemplary embodiment may include a retention mechanism, such as a clamp, lid or other feature used to hold the unit dose blister in place. Respective storage apparatuses 140 of another exemplary embodiment may further include one or more clipping mechanisms 149 that are capable of retaining the storage apparatus 140 within the storage system 102 while the storage system 102 is in motion (e.g., while the carousel is turning).

Figure 15:
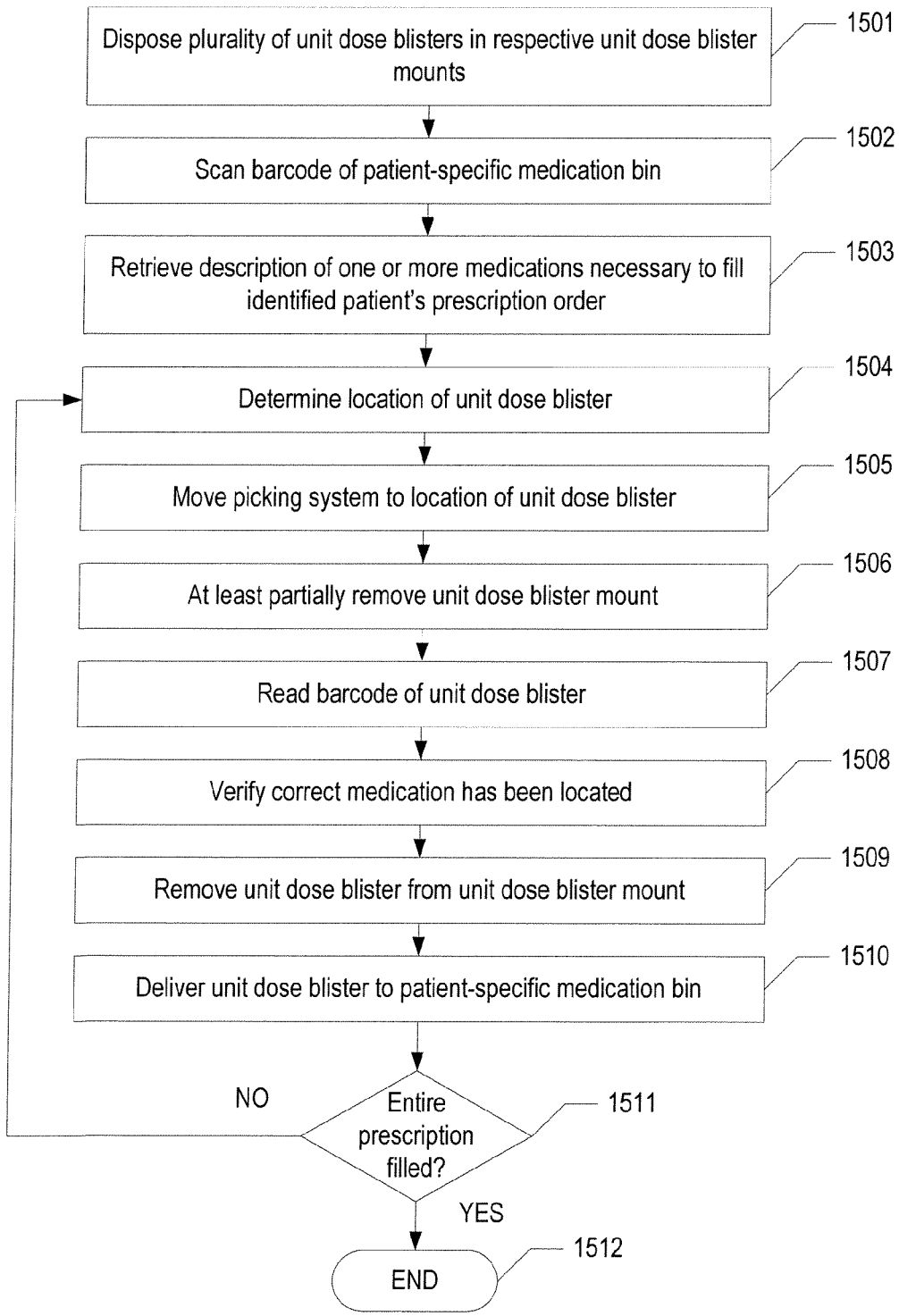
FIG. 15 is a flow chart illustrating the steps which may be taken in order to store, retrieve and delivery unit dose blisters in accordance with an exemplary embodiment of the present invention.

Method of Retrieving and Delivering Unit Dose Medications:

Reference is now made to FIG. 15, which illustrates the steps which may be taken in order to store, retrieve and deliver unit dose packages, such as unit dose blisters, in their natural, raw state in accordance with exemplary embodiments of the present invention. As above, the following method is described in terms of unit dose blisters, but should not be taken as limiting the scope of exemplary embodiments of the present invention to use of unit dose blisters. In contrast, other types of unit dose packages (i.e., packages used to store unit dose medications) may similarly be used in accordance with exemplary embodiments of the present invention without departing from the spirit and scope of the present invention.

As shown in FIG. 15, the process of one exemplary embodiment begins where, in Step 1501, a plurality of unit dose blisters of different shapes and sizes are disposed in respective unit dose blister mounts, for example, of the form discussed above. For example, the unit dose blister may be deposited in a carrier disposed within or otherwise associated with a respective storage location with its unit dose medication, or medication cavity, down (i.e., within the cavity of the carrier), such that the support panel of the unit dose blister will lie substantially flat in the horizontal plane enabling the barcode, or similar identification code, and/or other identification information, displayed on the unit dose blister to be viewable from above. As discussed above, other means for disposing unit dose blisters in a repeatable, predetermined orientation, such that the identification code of the unit dose blister can be readily scanned and the unit dose blister itself can be easily handled by a robotic picking system, can likewise be used without departing from the spirit and scope of the present invention. This would include, for example, disposing the unit dose blisters in respective coils of one or more springs that are aligned to form rows and columns in a manner similar to a vending machine.

In Step 1502, the identification code (e.g., barcode, RFID tag, text, or the like) associated with a patient-specific medication bin or container is read in order to determine the identity of a patient for which a prescription is to be filled. The identification code may, for example, store a unique patient identification code. The patient-specific medication container may, for example, be moving on a conveyor belt associated with the storage, retrieval and delivery system discussed above, such that when the container reaches a specified point, the identification code is automatically read to retrieve the identification information. In another exemplary embodiment, not shown, the container (referred to herein as a "floor stock container") may be associated with a particular cabinet or medication room within a hospital, or similar institution, that needs to be restocked. In other words, scanning the identification code of the floor stock container may identify the one or more unit dose medications necessary to restock the corresponding cabinet or medication room, rather than providing information relating to a specific patient.

Returning to FIG. 15, using the identity of the patient, in Step 1503, a list of one or more unit dose medications necessary to fill the identified patient's prescription is retrieved. As discussed above, in one exemplary embodiment a controller associated with the storage, retrieval and delivery system may store information identifying one or more patients, as well as a corresponding description of the one or more medications required by that patient within a given period of time. Step 1503 may, therefore, involve accessing this information in order to determine which medications correspond with the identified patient.

In exemplary embodiments, Steps 1502 and 1503 may be sidestepped where, for example, a pharmacist or pharmacy technician manually inputs either the unique patient identification code associated with a particular patient, or the actual list of medications to be retrieved. This may be done, for example, where the pharmacist or pharmacy technician wants a single prescription filled immediately (i.e., not as part of the routine daily prescription fills—e.g., in the case of an emergency or as a first dose).

A location of the unit dose blister corresponding with the first unit dose medication is then determined, in Step 1504. In particular, this may involve determining a location in, for example, the storage system described above, associated with a unit dose blister mount holding the unit dose blister (e.g., in the form of X, Y and Z coordinates). Where the unit dose blister mount includes two or more cavities for receiving unit dose medications, this step may further include determining in which cavity the unit dose medication is held.

Once the location of the unit dose medication has been determined, the picking system may be moved to that location (Step 1505), and the unit dose blister mount may at least partially be removed from the storage system (Step 1506). In particular, as discussed above, in one exemplary embodiment, the picking system of a retrieval and delivery system may include a mount removal mechanism configured to extend to a location proximate the unit dose blister mount, to grip the handle of the unit dose blister mount, and to retract once the unit dose blister mount has been gripped. In removing the unit dose blister mount, the mount removal mechanism may deliver the unit dose blister mount to a predefined location so that the identification code (e.g., barcode, RFID tag, text or the like) displayed on the unit dose blister held by the unit dose blister mount can be read (e.g., to present the unit dose blister to the Z-Axis component). In one exemplary embodiment, this may involve completely disengaging the unit dose blister mount from the storage system and moving it to, for example, an inspection station. Alternatively, in another exemplary embodiment, the unit dose blister mount may be partially retained by the storage system while the following steps are performed.

In Step 1507, the identification code of the unit dose blister is read by the picking system, for example, in the manner discussed above, in order to determine the identity of the unit dose medication packaged in the unit dose blister. It is then verified, in Step 1508, that the correct medication has been located. If the correct medication has been located, the unit dose blister is removed from the unit dose blister mount, for example using the blister removal mechanism discussed above, (Step 1509) and delivered to the patient-specific medication container (Step 1510). In particular, the unit dose blister may first be delivered to a container associated with the overall storage, retrieval and delivery system, and from which it can be dispelled out the back of the system into the patient-specific medication container, which is being carried by a conveyor belt. Alternatively, as noted above, the container into which the unit dose blister is ultimately dispelled may comprise a floor stock container associated not with a specific patient, but instead with a particular cabinet or medication room needing restocking. As yet another alternative, in the exemplary embodiment discussed above wherein a pharmacist or pharmacy technician has manually requested that the medication be retrieved (i.e., sidestepping Steps 1502 and 1503 in the event of an emergency or in order to fill a first dose), the unit dose blister may be individually dispelled from the first container, for example, out a chute on the front of the storage, retrieval and delivery system.

Returning to FIG. 15, it is then determined, in Step 1511, whether the patient's entire prescription has been filled. If the prescription has not been completely filled, the process repeats Steps 1504-1510. If, on the other hand, all of the unit dose medications needed for the particular patient have been retrieved, the process ends, at Step 1512. The patient-specific medication container is then ready to be moved, for example, to a checking station where it is again verified that the correct medications have been retrieved and, finally, to be delivered to a nurse for delivery to the patient.

The present invention also lends itself to various alternative embodiments. For example, the picking system may be configured such that the unit dose blister mount and the corresponding unit dose blister remains in the storage location while the identification code is read and verified with the unit dose blister being removed from the unit dose blister mount and delivered only once the medication has been verified. Alternatively, the unit dose blister could be stored loosely, i.e., independent of a unit dose blister mount, with the unit dose blister being removed from the storage location by the picking system and transported to a predefined location at which the unit dose blister is disposed within the unit dose blister mount. In this regard, the unit dose blister mount may have various configurations such as the carrier described above, or a clip or other mechanism for holding unit dose blisters in a repeatable fashion such that the identification code is disposed in a predetermined plane.

CONCLUSION

As described above, the method, system and apparatus of exemplary embodiments enable a pharmacy, a hospital or the like to store, retrieve and delivery unit dose blisters that have not be over-wrapped or repackaged. Unit dose blisters of various shapes and sizes are handled in their natural, raw state, thus taking advantage of the identification information currently displayed on each individual unit dose blister and cutting down on material costs and technician and pharmacist time associated with over-wrapping or repackaging, as well as with validating the process.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of scanning an identification code of an unknown orientation, said method comprising:
   locating an edge of a surface of an item on which the identification code is displayed, wherein
      the item is located in a carrier, and
      locating the edge of the surface of the item comprises locating the edge of the item based at least in part on a contrast in brightness between the surface of the item and the carrier; and
   scanning one or more optical signals across the item in a predefined direction relative to the edge.

2. The method of claim 1, wherein the predefined direction is selected from a group consisting of substantially parallel to the edge and substantially perpendicular to the edge.

3. The method of claim 2 further comprising:
   continuing to scan the optical signals across the item in the predefined direction relative to the edge until the identification code is located or substantially the entire surface of the item has been scanned.

4. The method of claim 3 further comprising, where substantially the entire surface of the item has been scanned and the identification code has not been located:
   scanning one or more optical signals across the item in a direction substantially perpendicular to the predefined direction relative to the edge until the identification code is located.

5. The method of claim 1, wherein the item comprises a unit dose package configured to hold a unit dose medication, and wherein the carrier comprises a unit dose package mount configured to position a plurality of different types of unit dose packages of different shapes and sizes, such that respective unit dose packages are repeatably maintained in a predetermined plane.

6. The method of claim 1, wherein scanning the optical signals across the item comprises generating a plurality of optical signals and directing the optical signals to the item, such that the optical signals form an oblique angle with respect to the item upon reflection off of the item.

7. The method of claim 6 further comprising:
   automatically changing a focal distance associated with the optical signals.

8. A system for scanning an identification code of an unknown orientation, said system comprising:
   a carrier configured to hold an item;
   a code reader configured to locate an edge of a surface of the item on which the identification code is displayed based at least in part on a contrast in brightness between the surface of the item and the carrier; and
   scanning one or more optical signals across the item in a predefined direction relative to the edge.

9. The system of claim 8, wherein the predefined direction is selected from a group consisting of substantially parallel to the edge and substantially perpendicular to the edge.

10. The system of claim 8, wherein the code reader is further configured to continue scanning the optical signals across the item in the predefined direction relative to the edge until the identification code is located or substantially the entire surface of the item has been scanned.

11. The system of claim system of claim 10, wherein the code reader is further configured, where substantially the entire surface of the item has been scanned and the identification code has not been located, to scan one or more optical signals across the item in a direction substantially perpendicular to the predefined direction relative to the edge until the identification code is located.

12. The system of claim 8, wherein the item comprises a unit dose package configured to hold a unit dose medication, and wherein the carrier comprises a unit dose package mount configured to position a plurality of unit dose packages of different shapes and sizes, such that respective unit dose packages are repeatedly maintained in a predetermined plane, said system comprising a system for retrieving and delivering the plurality of unit dose packages.

13. The system of claim 8, wherein, in order to scan the optical signals across the item, the code reader is further configured to generate a plurality of optical signals and to direct the optical signals to the item, such that the optical signals form an oblique angle with respect to the item upon reflection off of the item.

14. The system of claim 13, wherein the code reader is further configured to change a focal distance associated with the optical signals.

15. A system for scanning an identification code of an unknown orientation, said system comprising:
   a carrier configured to hold an item displaying an identification code on a surface of the item; and
   a code reader configured to locate at least a first and a second edge of the surface of the item based at least in part on a contrast in brightness between the surface of the item and the carrier, wherein the first edge is substantially perpendicular to the second edge, said code reader further configured to scan one or more optical signals across the item in a direction substantially parallel to the first edge of the surface until the identification code is located or substantially the entire surface of the item has been scanned, said code reader further configured, where substantially the entire surface of the item has been scanned and the identification code has not been located, to scan one or more optical signals across the item in a direction substantially parallel to the second edge until the identification code is located.

16. The system of claim 15, wherein the item comprises a unit dose package configured to hold a unit dose medication, and wherein the carrier comprises a unit dose package mount configured to position a plurality of unit dose packages of different shapes and sizes, such that respective unit dose packages are repeatedly maintained in a predetermined plane, said system comprising a system for retrieving and delivering the plurality of unit dose packages.

17. An apparatus for scanning an identification code of an unknown orientation, said apparatus comprising:
   a carrier configured to hold an item;
   means for locating an edge of a surface of the item on which the identification code is displayed based at least in part on a contrast in brightness between the surface of the item and the carrier; and means for scanning one or more optical signals across the item in a predefined direction relative to the edge.

18. The apparatus of claim 17, wherein the predefined direction is selected from a group consisting of substantially parallel to the edge and substantially perpendicular to the edge.

19. The apparatus of claim 17 further comprising:
means for continuing to scan the optical signals across the item in the predefined direction relative to the edge until the identification code is located or substantially the entire surface of the item has been scanned.

20. The apparatus of claim 19 further comprising, where substantially the entire surface of the item has been scanned and the identification code has not been located:
means for scanning one or more optical signals across the item in a direction substantially perpendicular to the predefined direction relative to the edge until the identification code is located.

21. The apparatus of claim 17, wherein the item comprises a unit dose package configured to hold a unit dose medication, and wherein the carrier comprises a unit dose package mount configured to position a plurality of different types of unit dose packages of different shapes and sizes, such that respective unit dose packages are repeatably maintained in a predetermined plane.

22. The apparatus of claim 17, wherein the means for scanning the optical signals across the item comprises a code reader configured to generate a plurality of optical signals and to direct the optical signals to the item, such that the optical signals form an oblique angle with respect to the item upon reflection off of the item.

23. The apparatus of claim 22 further comprising:
means for automatically changing a focal distance associated with the optical signals.

* * * * *